(12) United States Patent
Nakano et al.

(10) Patent No.: US 10,394,109 B2
(45) Date of Patent: Aug. 27, 2019

(54) PROJECTOR SUSPENSION DEVICE

(71) Applicant: Seiko Epson Corporation, Tokyo (JP)

(72) Inventors: Hirohisa Nakano, Matsumoto (JP); Toshimitsu Watanabe, Matsumoto (JP); Nobuyuki Otsuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/006,647

(22) Filed: Jun. 12, 2018

(65) Prior Publication Data

US 2018/0292736 A1  Oct. 11, 2018

Related U.S. Application Data

(63) Continuation of application No. 15/230,552, filed on Aug. 8, 2016, now Pat. No. 10,018,897, which is a
(Continued)

(30) Foreign Application Priority Data

Jun. 18, 2009  (JP) ................................. 2009-145049

(51) Int. Cl.
*F16M 11/10* (2006.01)
*G03B 21/14* (2006.01)
(Continued)

(52) U.S. Cl.
CPC ........... *G03B 21/145* (2013.01); *F16M 13/02* (2013.01); *G03B 21/10* (2013.01); *G03B 21/14* (2013.01);
(Continued)

(58) Field of Classification Search
CPC ........ F16M 11/04; F16M 11/24; F16M 11/10; F16M 11/2092; F16M 2200/021;
(Continued)

(56) References Cited

U.S. PATENT DOCUMENTS 5,490,655 A    2/1996 Bates
5,551,658 A *  9/1996 Dittmer .................. G03B 21/00
                                                248/329
(Continued)

FOREIGN PATENT DOCUMENTS

JP          9-185125 A      7/1997
JP       2000-122180 A      4/2000
(Continued)

OTHER PUBLICATIONS

Non-Final Office Action received in U.S. Appl. No. 12/815,499; dated Jul. 23, 2012.
(Continued)

*Primary Examiner* — Nkeisha Smith
(74) *Attorney, Agent, or Firm* — ALG Intellectual Property, LLC

(57) ABSTRACT

A projector suspension device includes a base fixed to a wall, a support member extending from the base and supporting the projector, and an adjustment mechanism that adjusts rotation and a position of the projector. The adjustment mechanism includes a first slide substrate that slides with respect to the support member in a first direction perpendicular to the wall and adjusts the position of the projector in the first direction, a substrate fixed to the first slide substrate, a first rotating substrate that rotates with respect to the substrate, a second rotating substrate that rotates with respect to the first rotating substrate about an axis parallel to the wall and perpendicular to the substrate, and a turning member that adjusts a rotation of the second rotating substrate and has a rotating pivot perpendicular to the base. The second rotating substrate rotates about the axis by rotation of the turning member.

5 Claims, 10 Drawing Sheets

Related U.S. Application Data continuation of application No. 15/195,507, filed on Jun. 28, 2016, now Pat. No. 9,618,832, which is a continuation of application No. 13/887,457, filed on May 6, 2013, now Pat. No. 9,400,417, which is a continuation of application No. 12/815,499, filed on Jun. 15, 2010, now Pat. No. 8,454,174.

(51) Int. Cl.
*G03B 21/28* (2006.01)
*G03B 21/10* (2006.01)
*F16M 13/02* (2006.01)

(52) U.S. Cl.
CPC ....... *G03B 21/28* (2013.01); *F16M 2200/021* (2013.01); *F16M 2200/025* (2013.01)

(58) Field of Classification Search
CPC .............. F16M 2200/025; G03B 21/14; G03B 21/145; G03B 21/10; G03B 21/28
See application file for complete search history.

(56) References Cited

U.S. PATENT DOCUMENTS

| | | | |
|---|---|---|---|
| 6,059,413 A | 5/2000 | Okubo | |
| 6,485,144 B1* | 11/2002 | Liao | G03B 21/00 348/151 |
| 7,758,001 B2* | 7/2010 | Bouissiere | F16M 11/041 248/206.5 |
| 8,454,174 B2* | 6/2013 | Nakano | G03B 21/14 353/119 |
| 8,511,629 B2* | 8/2013 | Sullivan | F16M 11/10 248/286.1 |
| 8,573,551 B2* | 11/2013 | Hung | F16M 11/12 248/274.1 |
| 9,164,364 B2* | 10/2015 | Chang | G03B 21/145 |
| 2002/0131024 A1 | 9/2002 | Keenan et al. | |
| 2003/0234335 A1 | 12/2003 | Umberg | |
| 2004/0240962 A1 | 12/2004 | Teng et al. | |
| 2005/0264765 A1 | 12/2005 | Yang et al. | |
| 2007/0257181 A1 | 11/2007 | Dittmer | |
| 2008/0061200 A1* | 3/2008 | Bouissiere | F16M 11/041 248/206.5 |
| 2008/0179475 A1 | 7/2008 | Whitley et al. | |
| 2008/0308700 A1* | 12/2008 | Wei | F16B 7/105 248/326 |
| 2009/0294619 A1* | 12/2009 | David | F16M 11/043 248/324 |
| 2010/0155563 A1 | 6/2010 | Koh | |
| 2010/0314513 A1* | 12/2010 | Evans | F16M 11/08 248/217.4 |
| 2011/0089300 A1* | 4/2011 | Walters | F16M 11/12 248/274.1 |
| 2015/0277214 A1* | 10/2015 | Schuh | G03B 21/54 248/279.1 |

FOREIGN PATENT DOCUMENTS

| | | |
|---|---|---|
| JP | 2002-344846 A | 11/2002 |
| JP | 2004-133332 A | 4/2004 |
| JP | 2008-286873 A | 11/2008 |
| JP | 2009-048155 A | 3/2009 |

OTHER PUBLICATIONS

Notice of Allowance and Notice of Allowability received in U.S. Appl. No. 12/815,499; dated Feb. 5, 2013.
Non-Final Office Action received in U.S. Appl. No. 13/887,457; dated Dec. 9, 2013.
Final Office Action received in U.S. Appl. No. 13/887,457; dated Jun. 26, 2014.
Non-Final Office Action received in U.S. Appl. No. 13/887,457; dated Feb. 10, 2015.
Final Office Action received in U.S. Appl. No. 13/887,457; dated Aug. 24, 2015.
Non-Final Office Action received in U.S. Appl. No. 13/887,457; dated Nov. 24, 2015.
Notice of Allowance and Notice of Allowability received in U.S. Appl. No. 13/887,457; dated Mar. 25, 2016.
Non-Final Office Action received in U.S. Appl. No. 15/230,552; dated Dec. 22, 2016.
Final Office Action received in U.S. Appl. No. 15/230,552; dated Jul. 25, 2017.
Notice of Panel Decision from Pre-Appeal Brief Review received in U.S. Appl. No. 15/230,552; dated Nov. 30, 2017.
Notice of Allowance and Notice of Allowability received in U.S. Appl. No. 15/230,552; dated Mar. 13, 2018.

* cited by examiner

PROJECTOR SUSPENSION DEVICE

CROSS-REFERENCE

The present application is a continuation application of U.S. patent application Ser. No. 15/230,552 filed Aug. 8, 2016, which is a continuation application of U.S. patent application Ser. No. 15/195,507 filed Jun. 28, 2016 (now U.S. Pat. No. 9,618,832), which is a continuation application of U.S. patent application Ser. No. 13/887,457 filed May 6, 2013 (now U.S. Pat. No. 9,400,417), which is a continuation application of U.S. patent application Ser. No. 12/815,499 filed Jun. 15, 2010 (now U.S. Pat. No. 8,454,174), which claims priority from Japanese Patent Application No. 2009-145049 filed on Jun. 18, 2009, which are hereby incorporated by reference in their entirety.

BACKGROUND

1. Technical Field

The present invention relates to a projector suspension device.

2. Related Art

Heretofore, a projector ceiling suspension device has been one to which a projector is fixed suspended from a ceiling. The projector ceiling suspension device, by being installed on the ceiling to fix the projector, causes an image projected from the projector to be projected onto a screen installed on a wall surface of a room, a self-standing screen, or the like. The projector ceiling suspension device is such that, when fixing the projector, the mounting position of the projector is adjusted and fixed in such a way that the image is projected onto a projection region on the screen.

FIGS. 10A and 10B are schematic configuration diagrams of a heretofore known projector ceiling suspension device, where FIG. 10A is a front view, and FIG. 10B a side view.

As shown in FIGS. 10A and 10B, the projector ceiling suspension device includes a ceiling suspension position adjustment mechanism 850. The ceiling suspension position adjustment mechanism 850 is roughly configured of a base member 851 fixed to a ceiling 810, a movable member 852 to which a projector 800 is fixed, pin members 853 which, being disposed in overlapping portions of the side surfaces of the base member 851 and the side surfaces of the movable member 852, make the movable member 852 pivotable with respect to the base member 851, and screw members 855 which fix the base member 851 and movable member 852 by pressing the overlapping portions of the base member 851 and movable member 852 together from either side in the vicinity of each pin member 853. Movement slots 854 having an approximate racetrack shape with each pin member 853 as the center of rotation are formed in portions of the movable member 852 through which the screw members 855 are inserted.

With this structure, it is possible for the projector 800 to move around the pin members 853 within the range of the movement slots 854 (in this case, the angle adjustment of the projector 800 can be carried out). The position adjustment of the projector 800 is to adjust the position of the projector 800 in such a way that a position (a projection position) onto which is projected the image projected from the projector 800 is aligned with a projection region on a screen. The fixation of the projector 800 can be carried out by tightening the screw members 855 while holding the projector 800 subjected to the position adjustment (in this case, the angle adjustment) in the position, thereby pressing the overlapping side surface portions of the base member 851 and movable member 852, and fixing the movable member 852 to the base member 851.

Although not shown, apart from the structure wherein the base member 851 is fixed directly to the ceiling 810, there is also a projector ceiling suspension device of a structure wherein a slide member to which the base member 851 is fixed so as to be slidable in a left-right direction or a front-back direction, or the like, is used between the base member 851 and ceiling 810. The position adjustment of the projector 800 in this case is such that, firstly, a position in the left-right direction or front-back direction of the projector 800 is roughly determined using the slide member, and the slide member and base member 851 are fixed by a screw member, or the like. Subsequently, the heretofore described position adjustment is carried out.

With the ceiling suspension position adjustment mechanism 850 of this kind of projector ceiling suspension device, a position adjustor (a user, or the like, of the projector), needing to carry out the position adjustment by supporting the projector, is burdened with the position adjustment. Also, with this kind of ceiling suspension position adjustment mechanism 850, as space, or the like, between component members is large, taking into account also a movement by an amount equivalent to the space during a screw fixation after the adjustment, and the like, it is impossible to carry out the position adjustment with a high precision.

In particular, when the projector is configured as a so-called short focus projector which, including a projection optical device having a reflecting mirror, causes an image magnification projection onto a screen at a short distance, as a slight misalignment in the position adjustment results in the image being projected with a large misalignment, a higher precision position adjustment (a fine adjustment) has been required in comparison with the heretofore known position adjustment.

Consequently, a projector ceiling suspension device has been demanded wherein it is possible to reliably carry out a high precision position adjustment (a fine adjustment), and a burden of the adjustment is reduced by improving an adjustment operability.

SUMMARY

An advantage of some aspects of the invention is to solve at least a part of the problems described above, and the invention can be embodied as the following embodiments or application examples.

Application Example 1

According to this application example, a projector suspension device including a projection optical device having a reflecting mirror, and a suspension position adjustment mechanism. The suspension position adjustment mechanism includes A. a pressing member which presses a first member and a second member, B. a screw member which, being fixed in the first member, passes through the second member, and C. a turning member which, by turning in threaded engagement with the screw member passing through the second member, adjusts the angle formed by the first member and second member, against the pressing force of the pressing member, with a pivot set perpendicular to the axial direction of the screw member as the center.

According to this kind of projector suspension device, it is possible to configure a suspension position adjustment mechanism with a simple configuration including the pressing member, screw member, and turning member. Also, with the suspension position adjustment mechanism, it is possible to prevent a rattling due to space between component members by applying a pressing force with the pressing member and, while reliably maintaining an adjusted angle, adjust (fine adjust) the angle formed by the first member and second member by an operation of turning the turning member. Because of this, it is possible to reliably carry out a high precision position adjustment (a fine adjustment) with respect to the projector including the projection optical device having the reflecting mirror. In particular, when the projector is a so-called short focus projector which, including a projection optical device having a reflecting mirror, causes an image magnification projection onto a screen at a short distance, a small tilt (misalignment) of the projector leads to a large tilt (misalignment) of a projection position. As opposed to this, it is highly advantageous that the high precision position adjustment (fine adjustment) which adjusts the small tilt can be reliably carried out using the suspension position adjustment mechanism. Also, by fixing the projector to one of the first member and second member, as well as it being possible to carry out the angle adjustment of the projector, there is no need for an adjustor (a user, or the like) to adjust the projector while holding it, as heretofore known, meaning that it is possible to improve an adjustment operability, and it is possible to reduce a burden of the position adjustment on the adjustor.

Application Example 2

With the projector suspension device according to the application example, it is preferable that the screw member is disposed inserted through the pressing member.

According to this kind of projector suspension device, as a configuration is such that the screw member is disposed inserted through the pressing member, it is possible to miniaturize the suspension position adjustment mechanism in comparison with a configuration wherein the screw member and pressing member are disposed separately, thus realizing the miniaturization of the projector suspension device.

Application Example 3

With the projector suspension device according to the application example, it is preferable that the pressing member is formed of a coil spring.

According to this kind of projector suspension device, as the pressing member is formed of a coil spring, it is possible to achieve a further miniaturization of the suspension position adjustment mechanism (a further miniaturization of the projector suspension device), and it becomes easier to design and process the pressing member.

BRIEF DESCRIPTION OF THE DRAWINGS

The invention will be described with reference to the accompanying drawings, wherein like numbers reference like elements.

FIG. 1A is a perspective view of a condition in which the top surface faces upward, and FIG. 1B is a perspective view of a condition in which the bottom surface faces upward.

FIG. 4A is a front view, and FIG. 4B a side view.

FIG. 10A is a front view, and FIG. 10B a side view.

DESCRIPTION OF EXEMPLARY EMBODIMENTS

Hereafter, a description will be given, based on the drawings, of an embodiment.

Embodiment

Figure 1A:
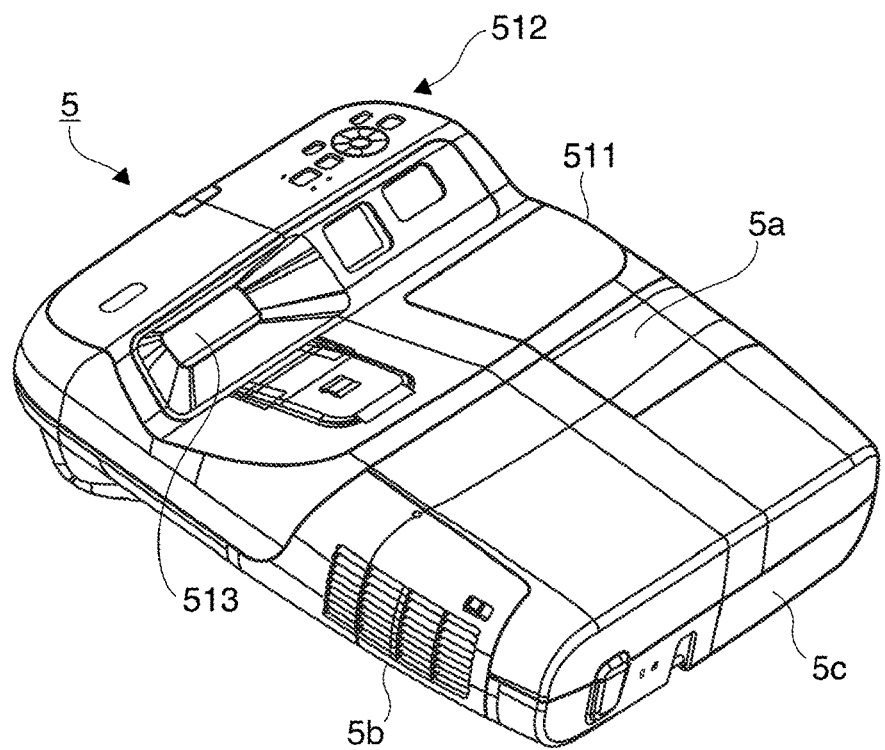
FIGS. 1A and 1B are perspective views of a projector mounted on a projector suspension device of an embodiment, where
Figure 1B:
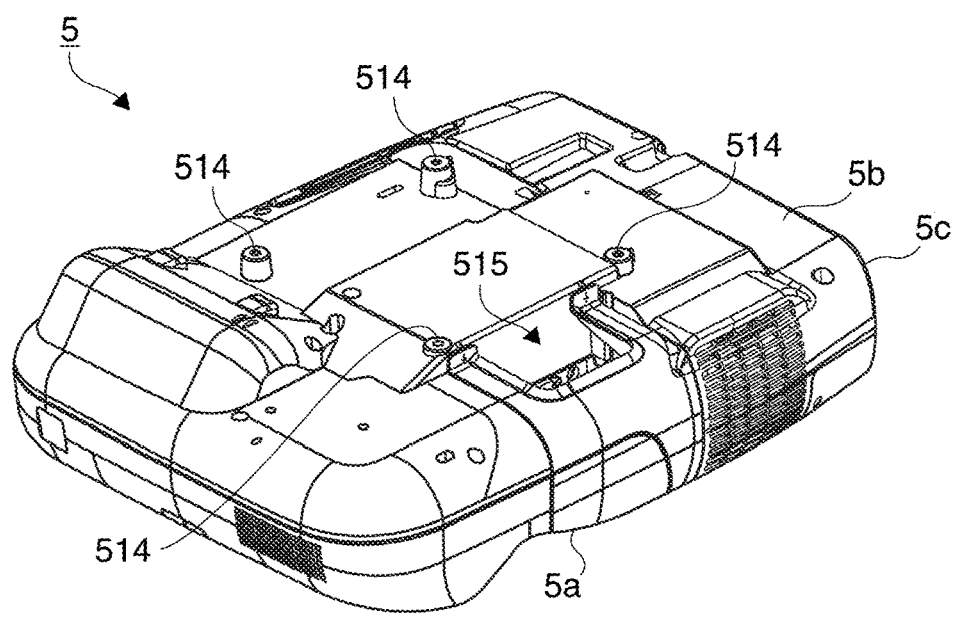

FIGS. 1A and 1B are perspective views of a projector mounted on a projector suspension device of the embodiment, where FIG. 1A is a perspective view of a condition in which the top surface faces upward, and FIG. 1B is a perspective view of a condition in which the bottom surface faces upward. Referring to FIGS. 1A and 1B, a description will be given of an external configuration, and an operation, of a projector 5.

Figure 2:
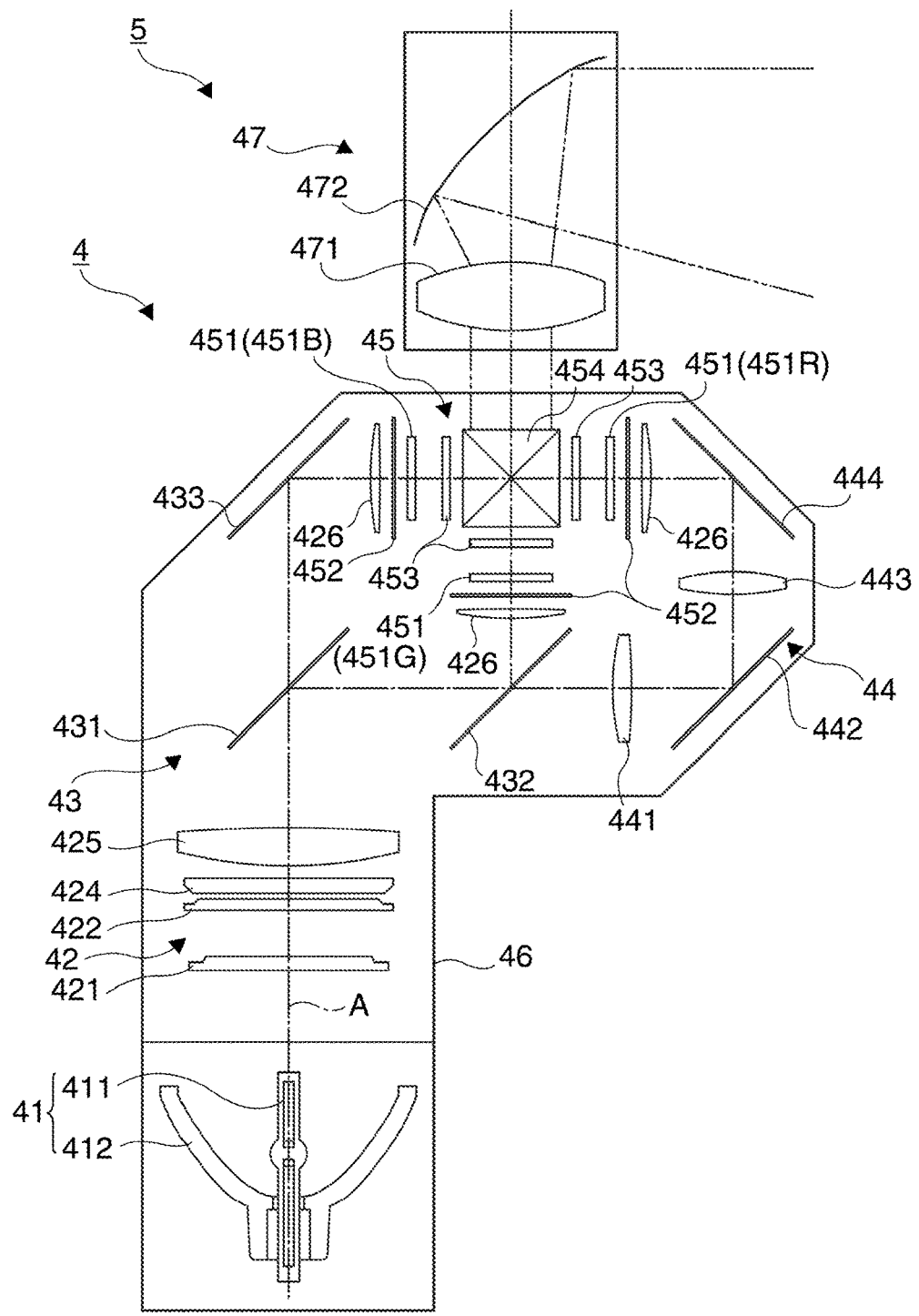
FIG. 2 is a plan view schematically showing an optical system of the projector.

The projector 5, based on an image signal, modulates a luminous flux emitted from a light source (a light source lamp 41) (refer to FIG. 2) with light modulation elements (liquid crystal panels 451) (refer to FIG. 2), forming an optical image, and projects the optical image onto a screen S (refer to FIGS. 4A and 4B), or the like, as an image (for example, a color image) via a projection optical device 47 (refer to FIG. 2).

As shown in FIG. 1A, the projector 5 is covered with an exterior housing 511 of an approximately rectangular parallelepiped shape. The projector 5 includes inside the exterior housing 511 an optical unit 4, to be described hereafter, a circuitry (not shown) configured including, for example, a controller (not shown) for causing the projector 5 to operate, and the like.

A switch section 512 with which an operation input is carried out, a dustproof projection window 513 through which a projection image is transmitted, and the like, are disposed on a top surface 5a of the projector 5. The projection optical device 47, to be described hereafter, is disposed on the inner surface side of the projection window 513 (inside the exterior housing 511), and the projection image emitted from the projection optical device 47 is projected from the top surface 5a side toward a back surface 5c side, via the projection window 513.

As shown in FIG. 1B, four fixing legs 514 for fixing the projector 5 to a suspension position adjustment mechanism 1, included in a projector suspension device 2 of the embodiment, when the projector 5 is installed suspended from a ceiling or a wall are disposed protruded. Specifically, the fixing legs 514 being formed with nuts (not shown) inserted therein, the projector 5 is fixed to the suspension position adjustment mechanism 1 by fixing screw members being threadedly engaged with the nuts. Also, an opening portion 515 is disposed in the bottom surface 5b. A cable or the like (not shown) connected to the projector 5, being inserted in the opening portion 515, is connected to an interface substrate (not shown) disposed inside the exterior housing 511.

The projector 5 of the embodiment, being configured on the premise that it is installed suspended from the ceiling or wall, has a structure wherein it is not assumed that the projector 5 is used placed on a desk. Also, the suspension position adjustment mechanism 1 included in the projector ceiling mounting apparatus 2 of the embodiment has a configuration such that it is installed on a wall surface 900 (refer to FIGS. 4A and 4B), and the projector 5 is suspended from the wall surface 900 with the suspension position adjustment mechanism 1.

FIG. 2 is a plan view schematically showing an optical system of the projector. Referring to FIG. 2, a brief description will be given of a configuration and operation of the optical system of the projector 5.

The optical unit 4 of the projector 5 forms an image light, based on the image signal, by being controlled by the controller. The optical unit 4 includes the light source (light source lamp 41), an illumination optical device 42, a color separation optical device 43, a relay optical device 44, an optical device 45, an optical part housing 46, and the projection optical device 47.

The light source lamp 41 is such that a luminous flux is reflected off a reflector 412 by a light emission of a light emitting tube 411, and emitted to an illumination region. The light source lamp 41 includes the light emitting tube 411 and reflector 412. The illumination optical device 42 is one for equalizing the illuminance of the luminous flux, emitted from the light source lamp 41, in a plane perpendicular to an illumination optical axis A. The illumination optical device 42 includes lens arrays 421 and 422, a polarization conversion element 424, and a superimposing lens 425. Also, the illumination optical device 42 includes three field lenses 426. The field lenses 426 being disposed upstream of the three corresponding liquid crystal panels 451 of the optical device 45, each of the field lenses 426 converts each partial luminous flux emitted from the lens array 422 into a luminous flux parallel to the central axis of each field lens 426.

The color separation optical device 43 separates illumination luminous fluxes from the illumination optical device 42 into three color lights, red (R), green (G), and blue (B), and guides them to the three liquid crystal panels 451. The color separation optical device 43 includes dichroic mirrors 431 and 432, and a reflecting mirror 433. As the optical path length of a color light (in the embodiment, the red color light) separated by the color separation optical device 43 is greater than the optical path length of the other color lights, the relay optical device 44 prevents a decrease in light use efficiency due to a divergence of light, or the like, and guides the color light to a liquid crystal panel 451 (in the embodiment, a liquid crystal panel 451R). The relay optical device 44 includes an incident side lens 441, a relay lens 443, and reflecting mirrors 442 and 444.

The optical device 45, based on the image signal, modulates each color light falling incident on each corresponding liquid crystal panel 451, forming an image light for each color light, and subsequently, causes the image lights to be synthesized by a color synthesis optical device. The optical device 45 includes the three liquid crystal panels 451 as the light modulation elements, three incident side polarizing plates 452, three emitting side polarizing plates 453, and a cross dichroic prism 454 as the color synthesis optical device. Also, the three liquid crystal panels 451 are configured of the red color light liquid crystal panel 451R as a red color light modulation element, a green color light liquid crystal panel 451G as a green color light modulation element, and a blue color light liquid crystal panel 451B as a blue color light modulation element.

The projection optical device 47 is configured including a projection lens 471 and a reflecting mirror 472 having a curved surface. The projection optical device 47 is such that an image light synthesized by the optical device 45 (color synthesis optical device) is magnified by the projection lens 471, reflected by the reflecting mirror 472, and projected magnified onto the screen S. A detailed description of each heretofore described optical device 41 to 45 and 47 is omitted.

Figure 3:
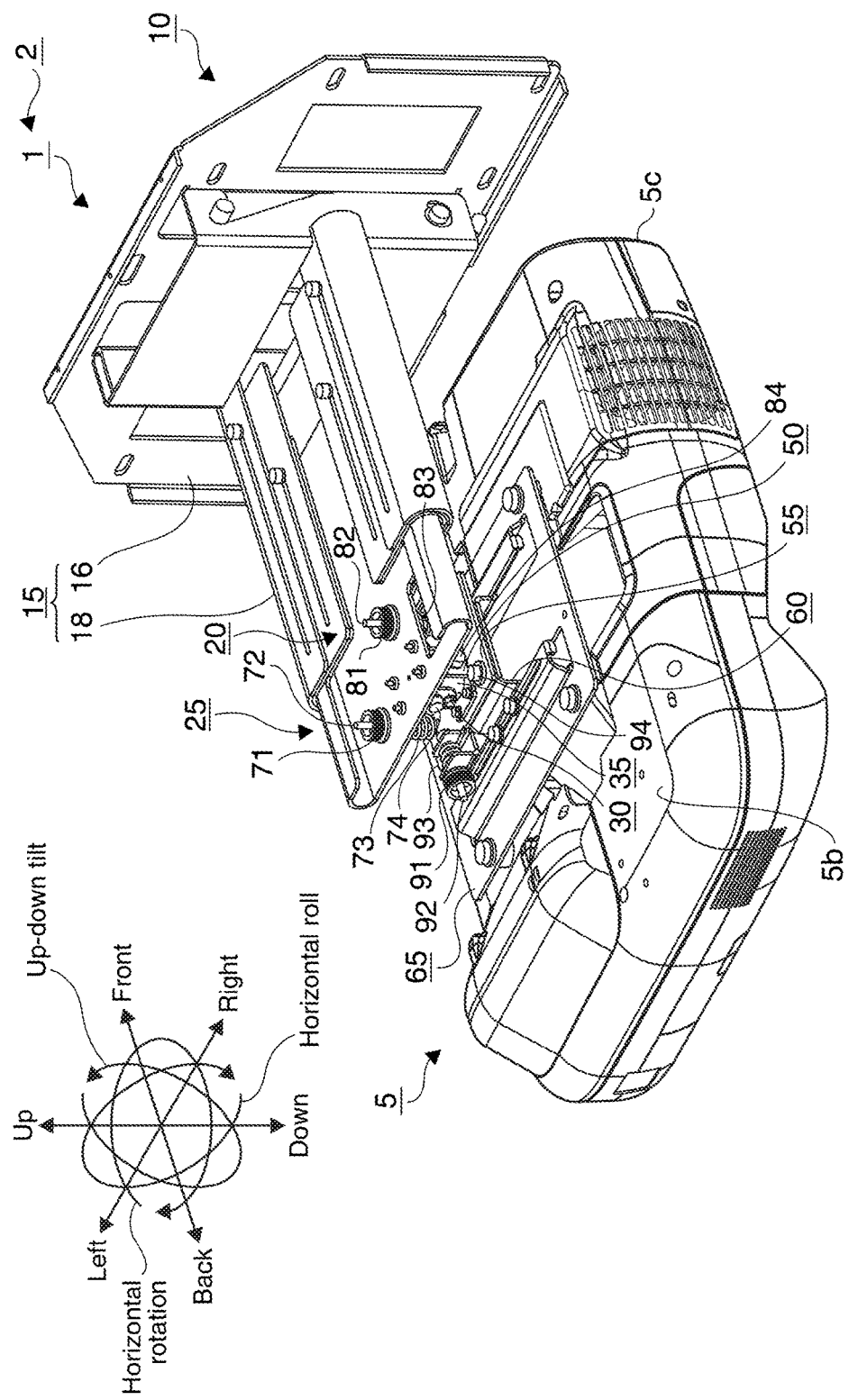
FIG. 3 is a perspective view showing a condition in which the projector is fixed to a projector suspension device.
Figure 4:
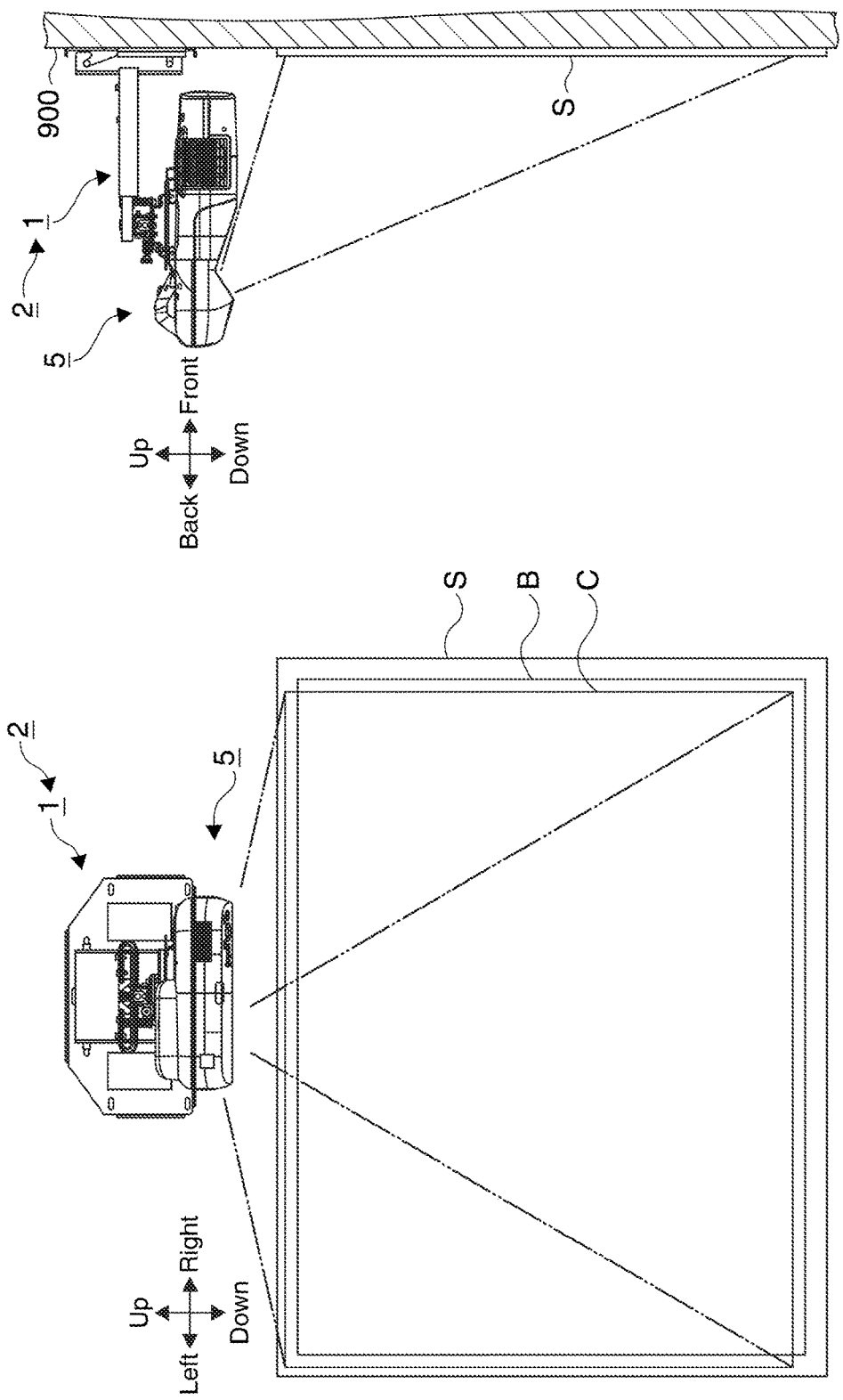
FIGS. 4A and 4B are drawings showing a condition in which the projector is fixed to the projector suspension device, and a projection is done onto a screen, where

FIG. 3 is a perspective view showing a condition in which the projector is fixed to the projector suspension device. FIGS. 4A and 4B are drawings showing a condition in which the projector is fixed to the projector suspension device, and a projection is done onto the screen, where FIG. 4A is a front view, and FIG. 4B a side view. FIG. 3 shows a condition of the suspension position adjustment mechanism 1 of the projector suspension device 2 seen from above. A description will be given, referring to FIGS. 3, 4A, and 4B, of a projection of the projector 5.

In the drawings (FIGS. 3, 4A, and 4B, and drawings to be described hereafter), when describing a direction of movement, or the like, of the suspension position adjustment mechanism 1, the normal direction of the wall surface 900 is taken to be a front-back direction, a direction toward the wall surface 900 a front direction, and a direction away from the wall surface 900 a back direction. Also, a direction of gravitational force perpendicular to the front-back direction and parallel to the wall surface 900 is taken to be an up-down direction, a direction opposing the gravitational force an up direction, and a direction the same as that of the gravitational force a down direction. Then, a direction perpendicular to the front-back direction and direction of gravitational force (up-down direction) is taken to be a left-right direction, the left side when facing the wall surface 900 a left direction, and the right side a right direction.

The projector suspension device 2 of the embodiment includes the suspension position adjustment mechanism 1 (hereafter abbreviated as the position adjustment mechanism 1). Also, the projector suspension device 2 is configured including, apart from the position adjustment mechanism 1, a cover member (not shown) covering the outer periphery of the position adjustment mechanism 1, and the like.

The position adjustment mechanism 1 is a mechanism (an apparatus) with which the projector 5 is fixed to an upper portion of the wall surface 900, and installed suspended therefrom, as shown in FIG. 4B. Also, the projector 5 is fixed with the bottom surface 5b side in the up direction, and with the back surface 5c side in the front direction (in the direction of the wall surface 900). Then, the projector 5 projects the projection image via the projection window 513 toward the screen S installed in a down direction portion of the wall surface 900 on which the position adjustment mechanism 1 is installed. An impression of the image light of the projection image projected from the projector 5 is shown by the two-dot chain lines in FIGS. 4A and 4B. As shown in FIG. 4B, the projector 5 of the embodiment is configured as a so-called short focus projector which causes an image magnification projection onto the screen S at a short distance.

The position adjustment mechanism 1 is an apparatus which, by adjusting the position of the projector 5 when the projector 5 projects the projection image, carries out an adjustment of a position of the projector 5 with respect to a projection position C of the projected projection image in such a way that the projection position C is aligned with a projection region B of the screen S.

As shown in FIG. 3, the position adjustment mechanism 1 is configured including a base substrate 10, a slide receiving substrate 15, a first slide substrate 20, a second slide substrate 25, a first holding plate 30, a pivotal support plate 35, a second holding plate 50, a spring fixing plate 55, a third slide substrate 60, a projector fixing substrate 65, and the like. Then, the position adjustment mechanism 1 is capable of six direction adjustments. Specifically, the position adjustment mechanism 1 is capable of a front-back adjustment, a left-right adjustment, an up-down adjustment, a horizontal roll adjustment, an up-down tilt adjustment, and a horizontal rotation adjustment.

Also, as a method of adjustment with the position adjustment mechanism 1, firstly, the projector 5 is fixed with the projection position C of the projector 5 roughly aligned with the projection region B of the screen S by carrying out the front-back adjustment, left-right adjustment, and up-down adjustment. Next, a fine adjustment is carried out by carrying out the horizontal roll adjustment, up-down tilt adjustment, and horizontal rotation adjustment, thus accurately aligning the projection position C with the projection region B. FIGS. 4A and 4B show a condition in which the projection region B of the screen S and the projection position C of the projector 5 are misaligned.

The up-down adjustment, being an adjustment carried out in the up-down direction, is carried out, in the embodiment, by an adjustment of the slide receiving substrate 15 with respect to the base substrate 10. The front-back adjustment, being an adjustment carried out in the front-back direction, is carried out, in the embodiment, by an adjustment of the first slide substrate 20 with respect to the slide receiving substrate 15, and an adjustment of the second slide substrate 25 with respect to the first slide substrate 20. The left-right adjustment, being an adjustment carried out in the left-right direction, is carried out, in the embodiment, by an adjustment of the projector fixing substrate 65 with respect to the third slide substrate 60.

The horizontal roll adjustment, being an adjustment of a left-right direction tilt with respect to the horizontal plane, is carried out, in the embodiment, by a tilt adjustment (an angle adjustment) of the spring fixing plate 55 with respect to the second slide substrate 25 by turning a first dial 71. The position adjustment mechanism 1 includes the first dial 71, a first screw member 72, a first spring member 73, a first turning pivot member 74, and the like, as components of a main portion for carrying out the horizontal roll adjustment. A horizontal roll mechanism section 70 is configured of the heretofore described component members for carrying out the horizontal roll adjustment, including the second slide substrate 25 and spring fixing plate 55.

The up-down tilt adjustment, being an adjustment of a front-back direction tilt with respect to the horizontal plane, is carried out, in the embodiment, by a tilt adjustment (an angle adjustment) of the spring fixing plate 55 with respect to the second slide substrate 25 by turning a second dial 81.

The position adjustment mechanism 1 includes the second dial 81, a second screw member 82, a second spring member 83, a second turning pivot member 84, and the like, as components of a main portion for carrying out the up-down tilt adjustment. An up-down tilt mechanism section 80 is configured of the heretofore described component members for carrying out the up-down tilt adjustment, including the second slide substrate 25 and spring fixing plate 55.

The horizontal rotation adjustment, being an adjustment of a parallel direction tilt (rotation) with respect to the horizontal plane, is carried out, in the embodiment, by a rotation adjustment (an angle adjustment) of the third slide substrate 60 with respect to the spring fixing plate 55 by turning a third dial 91. The position adjustment mechanism 1 includes the third dial 91, a third screw member 92, a third spring member 93, a third turning pivot member 94, a third pivot guide member 95, a pivoting limit member 96, a pivoting limit guide member 97, and the like, as components of a main portion for carrying out the horizontal rotation adjustment. A horizontal rotation mechanism section 90 is configured of the heretofore described component members for carrying out the horizontal rotation adjustment, including the spring fixing plate 55 and third slide substrate 60.

Figure 5:
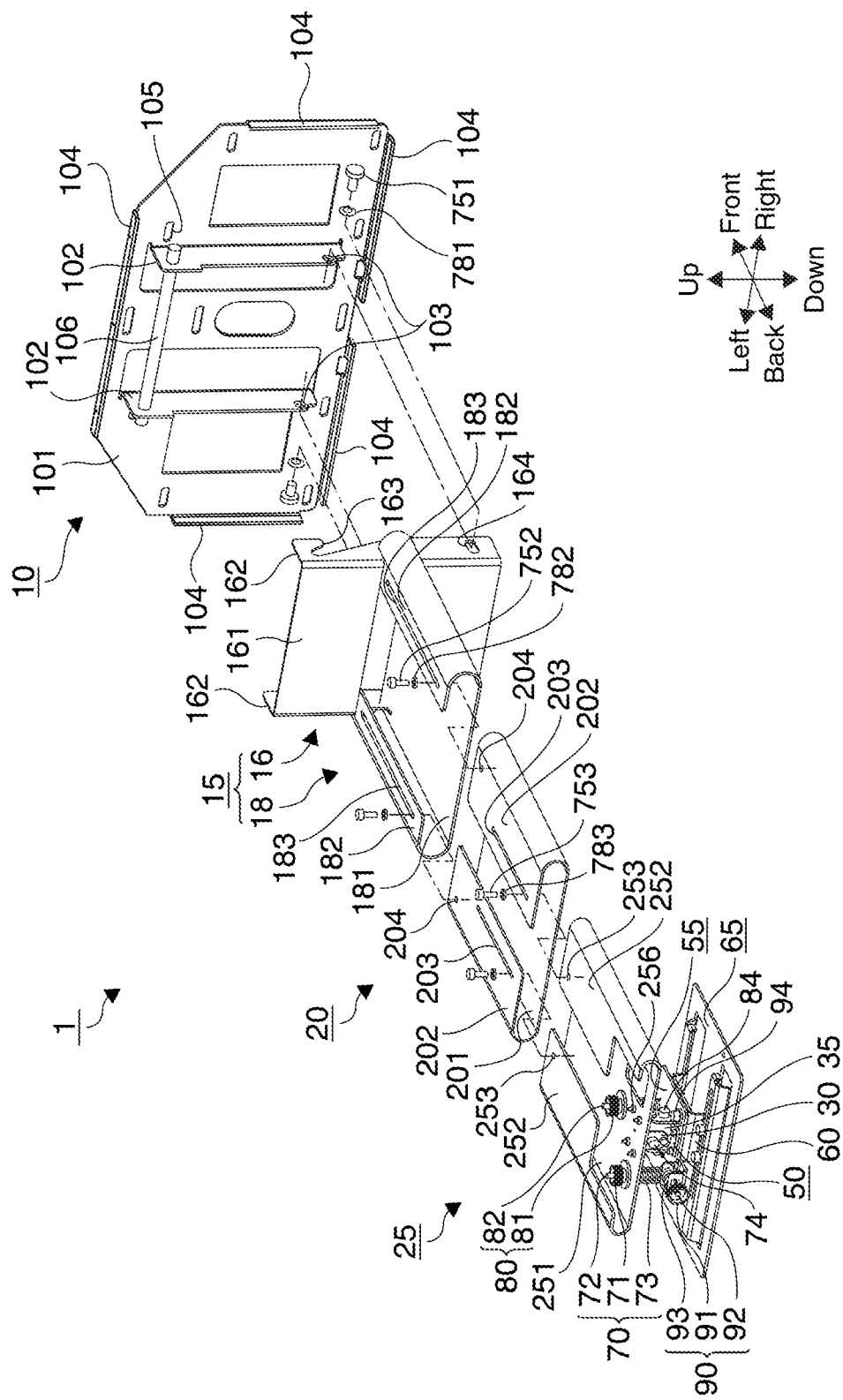
FIG. 5 is an assembly diagram of a suspension position adjustment mechanism.
Figure 6:
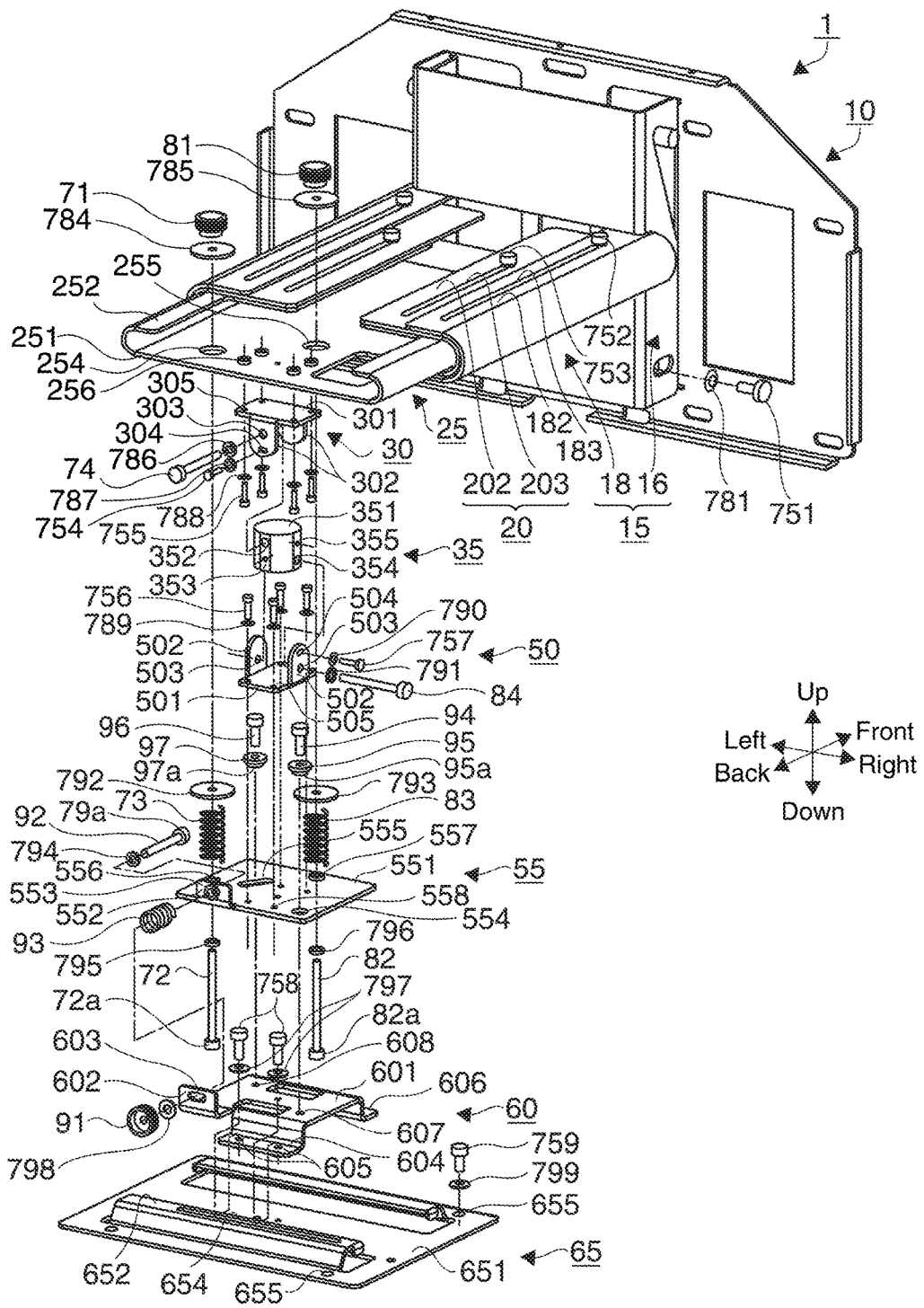
FIG. 6 is an assembly diagram of the suspension position adjustment mechanism.

FIGS. 5 and 6 are assembly diagrams of the suspension position adjustment mechanism. Specifically, FIG. 5 is an assembly diagram of the base substrate 10 to the second slide substrate 25. FIG. 6 is an assembly diagram of the first holding plate 30 to the projector fixing substrate 65. Referring to FIGS. 5 and 6, a description will be given of a configuration, an assembling method, and an adjustment method, of the position adjustment mechanism 1. FIGS. 3, 4A, and 4B will be referred to as appropriate.

A description will be given of configurations of the base substrate 10, slide receiving substrate 15, and first slide substrate 20 which configure the position adjustment mechanism 1.

The base substrate 10 is a member which fixes the position adjustment mechanism 1 to the wall surface 900. The base substrate 10 is formed of an approximately rectangular base substrate main body 101. The base substrate main body 101 includes in the center thereof erect portions 102 erected parallel to the up-down direction and facing in the back direction. Also, the base substrate main body 101 includes at the outer peripheral edge thereof erect portions 104 erected in the back direction, thus securing the rigidity of the base substrate 10. Also, the base substrate main body 101 includes a plurality of screw through holes 105 used in fixing the base substrate 10 to the wall surface 900.

Also, a cylindrically formed hook support member 106 which, being fixed to the two erect portions 102, is for pivotably hooking thereover hook portions 163 of the slide receiving substrate 15 is fixed in the upper portions of the erect portions 102. Also, slide receiving substrate fixing holes 103, which are threadedly engaged with fixing screws 751 for clamping and fixing slot portions 164 of the slide receiving substrate 15, are formed, opposed to each other, in the two erect portions 102.

The slide receiving substrate 15 is configured of a substrate fixing portion 16 fixed to the base substrate 10, and a slide receiving portion 18 which receives and fixes the first slide substrate 20. The slide receiving substrate 15 is configured so that one end of the slide receiving portion 18 is fixed fitted in a left-right direction portion of the approximate center of the substrate fixing portion 16. With this configuration, the slide receiving portion 18 is configured so that it is fixed approximately perpendicular to the substrate fixing portion 16.

The substrate fixing portion 16, being formed of an approximately rectangular substrate fixing portion main body 161, includes bend portions 162 formed by bending both left and right end portions thereof at right angles in the front direction. In the upper portions of the bend portions 162, the hook portions 163, cut away with a diameter which can be hooked over the diameter of the hook support member 106 of the base substrate 10, are formed, opposed to each other, in the two bend portions 162. Also, in the lower portions of the bend portions 162, the slot portions 164 are formed, opposed to each other, in the two bend portions 162.

The slide receiving portion 18, being formed of an approximately rectangular slide receiving portion main body 181, includes bend portions 182 formed by curving both left and right end portions thereof in the up direction, and then bending them inward in such away as to be parallel to the surface of the slide receiving portion main body 181. Slide slots 183 extending in the front-back direction are formed in the two bend portions 182.

The first slide substrate 20 is a member which is slid and fixed in the slide receiving substrate 15, and also, in which the second slide substrate 25 is slid and fixed. The first slide substrate 20, being formed of an approximately rectangular first slide substrate main body 201, includes bend portions 202 formed by curving both left and right end portions thereof in the up direction, and then bending them inward in such a way as to be parallel to the surface of the first slide substrate main body 201. Slide slots 203 extending in the front-back direction are formed in the two bend portions 202. Also, slide fixing holes 204 for inserting and sliding the first slide substrate 20 into the slide receiving portion 18 of the slide receiving substrate 15, and fixing the first slide substrate 20 in the slide receiving portion 18, are formed in the front direction portions of the two bend portions 202.

Referring to FIG. 5, a description will be given of a method of assembling (fixing) the position adjustment mechanism 1.

A description will be given of an outline flow of the method of assembling the position adjustment mechanism 1 of the embodiment.

Firstly, the component members up to the first slide substrate 20 are assembled on the base substrate 10 installed on the wall surface 900. Next, the second slide substrate 25 to the pivoting plate 35 are assembled. Next, the second holding plate 50 to the projector fixing substrate 65 are assembled.

Subsequently, a position adjustment mechanism 1 section into which the second holding plate 50 to the projector fixing substrate 65 have been assembled is assembled on a position adjustment mechanism 1 section into which the second slide substrate 25 to the pivoting plate 35 have been assembled. Subsequently, the projector 5 is fixed to the projector fixing substrate 65. Finally, a position adjustment mechanism 1 section from the second slide substrate 25 to the projector fixing substrate 65 to which the projector 5 has been fixed is assembled on the first slide substrate 20 assembled on the wall surface 900. With the above assembling method, it is possible to assemble the position adjustment mechanism 1, and suspend the projector 5 from the position adjustment mechanism 1 fixed to the wall surface 900.

A description will be given of a method of assembling the base substrate 10, which is the first member to be fixed to the wall surface 900, the slide receiving substrate 15, and the first slide substrate 20.

A description will be given of a method of assembling (fixing) the base substrate 10 on (to) the wall surface 900.

The base substrate 10 is fixed by inserting fixing screws (not shown) inserted through washers (not shown) through the screw through holes 105, and screwing them into the wall surface 900.

A description will be given of a method of fixing the base substrate 10 and slide receiving substrate 15. Firstly, the hook portions 163 of the slide receiving substrate (substrate fixing portion 16) are hooked over the hook support member 106 (specifically, portions of the hook support member 106 extending from the erect portions 102) of the base substrate 10. Next, the fixing screws 751 inserted through washers 781 are inserted through the slot portions 164, and threadedly engaged with the slide receiving substrate fixing holes 103 of the base substrate 10, thus holding the bend portions 162 on the erect portions 102, and thereby fixing the base substrate 10 and slide receiving substrate 15.

A description will be given of a method of fixing the slide receiving substrate 15 and first slide substrate 20. Firstly, the first slide substrate 20 is inserted into the slide receiving portion 18 of the slide receiving substrate 15. Next, fixing screws 752 inserted through washers 782 are inserted through the slide slots 183, and threadedly engaged with the slide fixing holes 204 of the first slide substrate 20, thus holding the bend portions 182 on the bend portion 202, and thereby fixing the slide receiving substrate 15 and first slide substrate 20.

By the above methods, it is possible to assemble the slide receiving substrate 15 and first slide substrate 20 on the base substrate 10 installed on the wall surface 900.

Next, referring to FIGS. 5 and 6, a description will be given of configurations of the second slide substrate 25 to the pivotal support plate 35 which configure the position adjustment mechanism 1.

The second slide substrate 25 is a member which is slid and fixed in the first slide substrate 20. Also, the second slide substrate 25 is a member for carrying out the horizontal roll adjustment and up-down tilt adjustment for the fine adjustment. The second slide substrate 25, being formed of an approximately rectangular second slide substrate main body 251, includes bend portions 252 formed by curving both left and right end portions thereof in the up direction, and then bending them inward in such a way as to be parallel to the surface of the second slide substrate main body 251. Slide fixing holes 253 for inserting, sliding, and fixing the second slide substrate 25 in the first slide substrate 20 are formed in the front direction portions of the two bend portions 252.

The second slide substrate 25 includes a first screw relief hole 254, formed for the horizontal roll adjustment, in a back direction portion of the second slide substrate main body 251. Also, in the same way, it includes a second screw relief hole 255 formed for the up-down tilt adjustment. Then, the second slide substrate 25 includes first holding plate fixing holes 256 which, being deburred and threaded, are for fixing the first holding plate 30 to the under surface of the second slide substrate main body 251.

The first holding plate 30 is a member which holds the first turning pivot member 74 which acts as a pivot for carrying out the horizontal roll adjustment. Also, it also holds the pivotal support plate 35, to be described hereafter. The first holding plate 30, being formed of an approximately rectangular first holding plate main body 301, includes erect portions 302 erected vertically in the down direction from the front-back direction edges. First pivot through holes 303 through which the first turning pivot member 74 is pivotably inserted are formed in the two erect portions 302. Also, a screw through hole 304 which, after carrying out the horizontal roll adjustment, is used for further reinforcing the fixation of the adjusted position is formed in a down direction portion of the back direction erect portion 302. Also, screw through holes 305 corresponding to the first holding plate fixing holes 256 of the second slide substrate 25 are formed in the first holding plate main body 301.

The pivotal support plate 35 is a member which links the first holding plate 30 and second holding plate 50. The pivotal support plate 35 holds (pivotally supports) the first turning pivot member 74 and the second turning pivot member 84 to be described hereafter. The pivotal support plate 35 is formed of a pivotal support plate main body 351 formed in an approximately octagonal cylindrical shape. First pivot through holes 352, through which the first turning pivot member 74 is inserted, are formed in opposed surfaces of the pivotal support plate main body 351. Also, second pivot through holes 354, through which the second turning pivot member 84 is inserted, are formed opposed in surfaces of the pivotal support plate main body 351 perpendicular to the surfaces in which the first pivot through holes 352 are formed.

Also, a fixing hole 353 is formed in a lower position of the back direction surface of the pivotal support plate main body 351 in which the first pivot through holes 352 are formed. Also, a fixing hole 355 is formed in an upper position of the right direction surface of the pivotal support plate main body 351 in which the second pivot through holes 354 are formed.

Next, a description will be given of a method of assembling (fixing) the second slide substrate 25 to the pivotal support plate 35.

A description will be given of a method of fixing the second slide substrate 25 and first holding plate 30. The screw through holes 305 of the first holding plate 30 are caused to correspond to the first holding plate fixing holes 256 of the second slide substrate 25, after which fixing screws 755 inserted through washers 788 are inserted through the screw through holes 305, and threaded engaged with the first holding plate fixing holes 256, thus holding the first holding plate main body 301 on the second slide substrate main body 251, and thereby fixing the second slide substrate 25 and first holding plate 30.

A description will be given of a method of fixing the pivotal support plate 35 and first holding plate 30. The pivotal support plate 35 is disposed between the opposed erect portions 302 of the first holding plate 30. Then, the first pivot through holes 352 of the pivotal support plate 35 are positioned caused to correspond to the first pivot through holes 303 of the first holding plate 30. At this time, the fixing hole 353 of the pivotal support plate 35 is positioned caused to correspond to the screw through hole 304 of the first holding plate 30.

Next, the first turning pivot member 74 inserted through a washer 786 is inserted through the first pivot through holes 303 of the first holding plate 30, and the first pivot through holes 352 of the pivotal support plate 35, and protruded from the front direction erect portion 302 of the first holding plate 30. A screw-threaded portion is formed on the leading end portion of the first turning pivot member 74 protruded from the erect portion 302, and an unshown nut is threadedly engaged with the screw-threaded portion. Because of this, the pivotal support plate 35 is pivotably fixed to the first holding plate 30 by the first turning pivot member 74. Also, in this condition, a fixing screw 754 inserted through a washer 787 is inserted through the screw through hole 304 of the first holding plate 30, and temporarily fixed in the fixing hole 353 of the pivotal support plate 35.

Next, referring to FIGS. 5 and 6, a description will be given of configurations of the second holding plate 50 to the projector fixing substrate 65 which configure the position adjustment mechanism 1.

The second holding plate 50 is a member which holds the second turning pivot member 84 which acts as a pivot for carrying out the up-down tilt adjustment. Also, it also holds the pivotal support plate 35. The second holding plate 50, being formed of an approximately rectangular second holding plate main body 501, includes erect portions 502 erected vertically in the up direction from the left-right direction edges of the second holding plate 50. Second pivot through holes 503 through which the second turning pivot member 84 is pivotably inserted are formed in the two erect portions 502. Also, a screw through hole 504 which, after carrying out the up-down tilt adjustment, is used for further reinforcing the fixation of the adjusted position is formed in an up direction portion of the right direction erect portion 502. Also, a screw through hole 505 corresponding to a second holding plate fixing hole 558, to be described hereafter, of the spring fixing plate 55 is formed in the second holding plate main body 501.

The spring fixing plate 55 is a member for, as well as fixing the second holding plate 50, carrying out the horizontal roll adjustment, up-down tilt adjustment, and horizontal rotation adjustment for the fine adjustment. The spring fixing plate 55, being formed of an approximately rectangular spring fixing plate main body 551, includes at the back direction edge thereof an erect portion 552 erected vertically in the up direction. The erect portion 552 includes therein a third screw member fixing hole 553 which, being protruded in the back direction, is deburred and threaded. Also, the spring fixing plate main body 551 includes therein a first screw member fixing hole 556 and second screw member fixing hole 557 which, being protruded in the up direction, are deburred and threaded.

Also, a third pivot guide member hole 554, which pivotably holds the third turning pivot member 94 (specifically, the third pivot guide member 95) acting as a pivot for carrying out the horizontal rotation adjustment, is formed in the spring fixing plate main body 551. Then, the spring fixing plate main body 551 includes therein a limit slot 555 which, being formed with the third pivot guide member hole 554 as the center, limits a rotation adjustment range when carrying out the horizontal rotation adjustment. Also, second holding plate fixing holes 558 for fixing the second holding plate 50 are formed in the spring fixing plate main body 551.

The third slide substrate 60 is a member for carrying out the horizontal rotation adjustment for the fine adjustment. Also, the third slide substrate 60 is a member which carries out an adjustment in the left-right direction (the left-right adjustment) of the projector fixing substrate 65, to be described hereafter. The third slide substrate 60, being formed of an approximately rectangular third slide substrate main body 601, includes at the back direction edge thereof an erect portion 602 extended therefrom and erected vertically in the up direction. The erect portion 602 includes therein a third screw member relief hole 603 elongated in the left-right direction.

The third slide substrate main body 601 includes at an edge portion thereof going away from the erect portion 602 an extending portion 604 which erects vertically in the down direction, and furthermore, extends at right angles in the back direction in such a way as to be parallel to the third slide substrate main body 601. The extending portion 604 includes therein slide fixing holes 605 for fixing the third slide substrate 60 to the projector fixing substrate 65 after carrying out the left-right adjustment (a slide adjustment) of the projector fixing substrate 65.

Also, the third slide substrate main body 601 includes at the front direction edge thereof an extending portion 606 which erects vertically in the down direction, and furthermore, extends at right angles in the front direction in such a way as to be parallel to the third slide substrate main body 601, and so as to be opposed to the extending portion 604. Also, the third slide substrate main body 601 includes therein a third pivot member fixing hole 607, in which the third turning pivot member 94 is fixed, and a pivoting limit member fixing hole 608, in which the pivoting limit member 96 is fixed.

The projector fixing substrate 65 is a member to which the projector 5 is fixed. The projector fixing substrate 65 is formed of an approximately rectangular fixing substrate main body 651. Then, the fixing substrate main body 651 includes in the center thereof an opposed slide receiving portion 652 and slide receiving portion 653 which are erected in the up direction parallel to the left-right direction, and furthermore, extended toward the center parallel to the fixing substrate main body 651. The back direction slide receiving portion 652 includes therein a slide slot 654 formed parallel to the left-right direction. Also, screw through holes 655 are formed in the fixing substrate main body 651 so as to correspond to the four fixing legs 514 of the projector 5.

Next, a description will be given of a method of assembling (fixing) the second holding plate 50 to the projector fixing substrate 65.

A description will be given of a method of fixing the second holding plate 50 and spring fixing plate 55. The screw through holes 505 of the second holding plate 50 are caused to correspond to the second holding plate fixing holes 558 of the spring fixing plate 55, after which the fixing screws 756 inserted through washers 789 are inserted through the screw through holes 505, and threadedly engaged with the second holding plate fixing holes 558, thus holding the second holding plate main body 501 on the spring fixing plate main body 551, and thereby fixing the second holding plate 50 and spring fixing plate 55.

Next, the first screw member 72, second screw member 82, and third screw member 92 are fixed in the spring fixing plate 55. Specifically, the first screw member 72 inserted through a washer 795 is threadedly engaged with the first screw member fixing hole 556 of the spring fixing plate main body 551 from the under surface of the spring fixing plate main body 551, and the first screw member 72 is tightened and fixed until a head 72a thereof abuts against the under surface of the spring fixing plate main body 551, and does not rotate any longer. In the same way, the second screw member 82 inserted through a washer 796 is threadedly engaged with the second screw member fixing hole 557 of the spring fixing plate main body 551 from the under surface of the spring fixing plate main body 551, and fixed in the same way. Next, the third screw member 92 inserted through a washer 794 is threadedly engaged with the third screw member fixing hole 553 of the erect portion 552 from the front direction of the erect portion 552, and tightened and fixed until a head 92a of the third screw member 92 abuts against the front direction surface of the erect portion 552, and does not rotate any longer.

Next, the third spring member 93 is fitted on the threaded portion of the third screw member 92 protruded in the back direction from the erect portion 552 of the spring fixing plate 55. In this condition, the leading end of the threaded portion of the third screw member 92 is inserted through the third screw member relief hole 603 from the front direction of the erect portion 602 of the third slide substrate 60, and moved in the back direction. The movement is carried out against a pressing force generated by the third spring member 93 being moved while being sandwiched between the erect portion 552 of the spring fixing plate 55 and the erect portion 602 of the third slide substrate 60 by the third spring member 93 abutting against the erect portion 602 of the third slide substrate 60. Then, the third pivot guide member hole 554 and limit slot 555 of the spring fixing plate 55 are aligned with the positions of the corresponding third pivot member fixing hole 607 and pivoting limit member fixing hole 608.

Next, a sliding portion 95a formed with a diameter smaller than the diameter of the outer shape of the third pivot guide member 95 is inserted into the third pivot guide member hole 554 from the up direction. Also, a sliding portion 97a formed with a diameter smaller than the diameter of the outer shape of the pivoting limit guide member 97 is inserted into the limit slot 555. Next, the third turning pivot member 94 is inserted through the third pivot guide member 95 from the up direction, and threadedly engaged with and fixed in the third pivot member fixing hole 607 of the third slide substrate 60. In the same way, the pivoting limit member 96 is inserted through the pivoting limit guide member 97 from the up direction, and threadedly engaged with and fixed in the pivoting limit member fixing hole 608 of the third slide substrate 60.

By this assembly, the spring fixing plate 55, to which the second holding plate 50 is fixed, and the third slide substrate 60 are integrated.

Next, the third slide substrate 60 is fixed to the projector fixing substrate 65. Specifically, firstly, the extending portions 604 and 606 of the third slide substrate 60 are inserted inside the corresponding slide receiving portions 652 and 653 of the projector fixing substrate 65. Next, the fixing screws 758 inserted through washers 797 are inserted from the up direction of the slide slot 654 of the slide receiving portion 652, and threadedly engaged with the slide fixing holes 605 of the extending portion 604, thereby fixing the third slide substrate 60 to the projector fixing substrate 65.

By this assembly, the spring fixing plate 55 to which the second holding plate 50 is fixed, the third slide substrate 60, and the projector fixing substrate 65 are integrated.

Next, a description will be given of a method of assembling (fixing) the position adjustment mechanism 1 section, into which the second holding plate 50 to the projector fixing substrate 65 has been assembled, on the position adjustment mechanism 1 section into which the second slide substrate 25 to the pivotal support plate 35 have been assembled.

Firstly, the first spring member 73 and a washer 792 are fitted on the threaded portion of the first screw member 72 protruded in the up portion from the spring fixing plate main body 551 of the spring fixing plate 55. In the same way, the second spring member 83 and a washer 793 are fitted on the threaded portion of the second screw member 82 protruded in the up direction from the spring fixing plate main body 551 of the spring fixing plate 55.

In this condition, next, the leading end of the threaded portion of the first screw member 72 is inserted through the first screw member relief hole 254 of the second slide substrate 25 from the down direction. Also, in the same way, the leading end of the threaded portion of the second screw member 82 is inserted through the second screw member relief hole 255 of the second slide substrate 25 from the down direction.

At this time, the first spring member 73 and second spring member 83 are moved in the up direction in such a way that the pivotal support plate 35 to which the first holding plate 30 is fixed is positioned between the erect portions 502 of the second holding plate 50 fixed to the spring fixing plate 55. The movement is carried out against a pressing force generated by the first spring member 73 and second spring member 83 being moved sandwiched between the spring fixing plate 55 and second slide substrate 25 by the first spring member 73 and second spring member 83 abutting against the second slide substrate 25 (specifically, across the washers 792 and 793).

By this movement, the second pivot through holes 503 of the second holding plate 50 are positioned caused to correspond to the second pivot through holes 354 of the pivotal support plate 35. Also, the screw through hole 504 of the second holding plate 50 is positioned caused to correspond to the fixing hole 355 of the pivotal support plate 35.

Next, the second turning pivot member 84 inserted through a washer 791 is inserted through the second pivot through holes 503 of the second holding plate 50 and the second pivot through holes 354 of the pivotal support plate 35, and protruded from the left direction erect portion 502 of the second holding plate 50. A screw-threaded portion is formed at the leading end portion of the second turning pivot member 84 protruded from the erect portion 502, and an unshown nut is threadedly engaged with the screw-threaded portion. Because of this, the pivotal support plate 35 is pivotably fixed to the second holding plate 50 by the second turning pivot member 84. Also, in this condition, the fixing screw 757 inserted through a washer 790 is inserted through the screw through hole 504 of the second holding plate 50, and temporarily fixed in the fixing hole 355 of the pivotal support plate 35.

In this case, a configuration is attained wherein the first turning pivot member 74 and second turning pivot member 84 are pivotally supported by the pivot support plate so as to be perpendicular to each other with space therebetween narrowed in the up-down direction. With this configuration, the miniaturization of the pivotal support plate 35, first holding plate 30, and second holding plate 50 is achieved.

By this assembly, the position adjustment mechanism 1 has integrated thereinto the second slide substrate 25, first holding plate 30, pivotal support plate 35, second holding plate 50, spring fixing plate 55, third slide substrate 60, and projector fixing substrate 65.

Next, the first dial 71, second dial 81, and third dial 91 are assembled. Specifically, by the heretofore described assembly, a washer 784 is fitted from the up direction on the first screw member 72 protruded in the up direction from the first screw member relief hole 254 of the second slide substrate 25. Next, the screw-threaded first dial 71 is threadedly engaged with the protruded first screw member 72. In the same way, a washer 785 is fitted from the up direction on the second screw member 82 protruded in the up direction from the second screw member relief hole 255, and the screw-threaded second dial 81 is threadedly engaged with the second screw member 82. Also, in the same way, a washer 798 is fitted from the back direction on the third screw member 92 protruded in the back direction from the third screw member relief hole 603 included in the erect portion 602 of the third slide substrate 60, and the screw-threaded third dial 91 is threadedly engaged with the third screw member 92.

Next, a description will be given of a method of fixing the projector 5 to the projector fixing substrate 65. Specifically, the four fixing legs 514 of the projector 5 are caused to correspond to the screw through holes 655 of the projector fixing substrate 65, and fixing screws 759 inserted through washers 799 are inserted through the screw through holes 655, and threadedly engaged with the fixing legs 514 of the projector 5, thereby fixing the projector 5 to the projector fixing substrate 65.

Because of this, with the position adjustment mechanism 1, the assembly of the second slide substrate 25 to the projector fixing substrate 65 is finished, and the projector 5 attains a fixed condition.

Next, a description will be given of a method of assembling a position adjustment mechanism 1 section from the second slide substrate 25 to the projector fixing substrate 65, to which the projector 5 is fixed, on the first slide substrate 20 assembled and fixed to the wall surface 900. Specifically, the second slide substrate 25 to which the component members up to the projector 5 are fixed is fixed to the first slide substrate 20.

A description will be given of a method of fixing the second slide substrate 25 and first slide substrate 20. Firstly, the second slide substrate 25 is inserted into the first slide substrate 20. Next, fixing screws 753 inserted through washers 783 are inserted through the slide slots 203 of the first slide substrate 20, and threadedly engaged with the slide fixing holes 253 of the second slide substrate 25, and the bend portions 202 are held on the bend portions 252, thereby fixing the second slide substrate 25 and first slide substrate 20. When fixing the second slide substrate 25 in the first slide substrate 20, as the slide slots 203 of the first slide substrate 20 are formed closer to the center side than the slide slots 183 of the slide receiving substrate 15, it is possible to fix the second slide substrate 25 and first slide substrate 20 without any interference with each other.

By the heretofore described assembling method, the position adjustment mechanism 1 is assembled as shown in FIG. 3, and it is possible to fix the position adjustment mechanism 1, from which the projector 5 is suspended, to the wall surface 900.

Hereafter, a description will be given of position adjustments (the up-down adjustment, front-back adjustment, and left-right adjustment) of the position adjustment mechanism 1.

The position adjustments are carried out by operating the projector 5, projecting the projection image (a projection light only is also acceptable) onto the screen S, and confirming the projection position C of the image projected onto the projection region B of the screen S. Firstly, an adjustment of roughly aligning the projection position C with the projection region B is carried out by carrying out the up-down adjustment, front-back adjustment, and left-right adjustment.

Firstly, a description will be given of the up-down adjustment of the position adjustment mechanism 1.

The up-down adjustment of the position adjustment mechanism 1 is carried out by an adjustment of the slide receiving substrate 15 with respect to the base substrate 10. Specifically, the up-down adjustment is carried out by firstly loosening the fixation (threaded engagement) by the fixing screws 751 and, after that, pivoting the slide receiving substrate 15 around the hook support member 106. The up-down adjustment in the embodiment is the same as a tilt adjustment which adjusts an inclination angle in the up-down direction. Also, after the up-down adjustment, the slide receiving substrate 15 is fixed to the base substrate 10 by tightening the fixing screws 751.

Next, a description will be given of the front-back adjustment of the position adjustment mechanism 1.

The front-back adjustment of the position adjustment mechanism 1 is carried out by an adjustment of the first slide substrate 20 with respect to the slide receiving substrate 15, and an adjustment of the second slide substrate 25 with respect to the first slide substrate 20.

A description will be given of the adjustment of the first slide substrate 20 with respect to the slide receiving substrate 15. The adjustment is carried out by firstly loosening the fixation (threaded engagement) by the fixing screws 752 and, after that, sliding the first slide substrate 20 into the slide receiving portion 18 of the slide receiving substrate 15. Also, after the adjustment, the first slide substrate 20 is fixed in the slide receiving substrate 15 by tightening the fixing screws 752.

Next, a description will be given of the adjustment of the second slide substrate 25 with respect to the first slide substrate 20. The adjustment is carried out by firstly loosening the fixation (threaded engagement) by the fixing screws 753 and, after that, sliding the second slide substrate into the first slide substrate 20. Also, after the adjustment, the second slide substrate 25 is fixed in the first slide substrate 20 by tightening the fixing screws 753. In this way, in the embodiment, two stages of slide are carried out by using the first slide substrate 20 and second slide substrate 25, and it is possible to increase the amount of adjustment in the front-back direction.

Next, a description will be given of the left-right adjustment of the position adjustment mechanism 1.

The left-right adjustment of the position adjustment mechanism 1 is carried out by an adjustment of the projector fixing substrate 65 with respect to the third slide substrate 60. Specifically, the left-right adjustment is carried out by firstly loosening the fixation (threaded engagement) by the fixing screws 758 and, after that, sliding the projector fixing substrate 65 fixing the projector 5 in the left-right direction with respect to the extending portions 604 and 606 of the third slide substrate 60. Also, after the left-right adjustment, the projector fixing substrate 65 is fixed to the third slide substrate 60 by tightening the fixing screws 758.

As heretofore described, by carrying out the up-down adjustment, front-back adjustment, and left-right adjustment, it is possible to roughly align the projection position C with the projection region B.

Hereafter, a description will be given of position adjustments (the horizontal roll adjustment, up-down tilt adjustment, and horizontal rotation adjustment) of the position adjustment mechanism 1.

As heretofore described, the horizontal roll adjustment, up-down tilt adjustment, and horizontal rotation adjustment are adjustments carried out after carrying out the up-down adjustment, front-back adjustment, and left-right adjustment, and roughly aligning the projection position C with the projection region B. Fine adjustments are carried out by carrying out the horizontal roll adjustment, up-down tilt adjustment, and horizontal rotation adjustment, thus making an adjustment in such a way that the projection position C is accurately aligned with the projection region B.

Firstly, a description will be given of the horizontal roll adjustment of the position adjustment mechanism 1.

Figure 7:
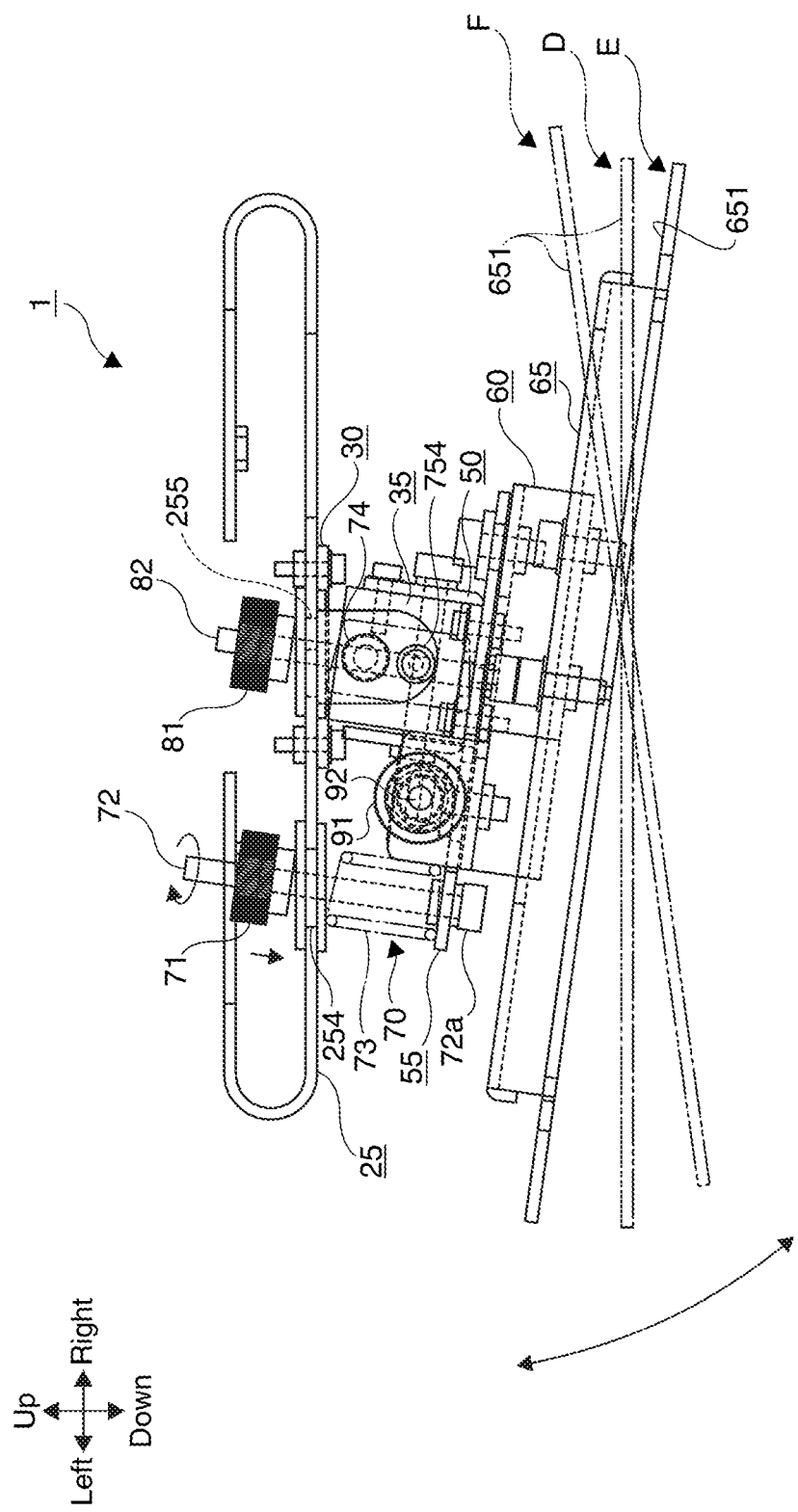
FIG. 7 is a drawing of a condition in which a horizontal roll adjustment is carried out, seen from a back direction.

FIG. 7 is a drawing of a condition in which the horizontal roll adjustment is carried out, seen from the back direction. FIG. 7 shows the second slide substrate 25 to the projector fixing substrate 65 and, for convenience of description, others are omitted.

The horizontal roll adjustment is carried out using the horizontal roll mechanism section 70. Specifically, the angle formed by the spring fixing plate 55 with respect to the second slide substrate 25 is adjusted by turning the first dial 71 shown in FIGS. 3 and 7.

As shown in FIG. 7, by turning the first dial 71 acting as a turning member in the clockwise direction, the threaded engagement thereof with the first screw member 72 acting as a screw member progresses, and the first dial 71 and the head 72a of the first screw member 72 come closer. In accordance with this, the spring fixing plate 55 rotates in the direction of the second slide substrate 25 with the first turning pivot member 74, which is disposed perpendicular to the axial direction of the first screw member 72 and guided by the first holding plate 30 and pivotal support plate 35, as the central axis. Because of this, it is possible to adjust the angle formed by the second slide substrate 25 and spring fixing plate 55. At this time, the first spring member 73 acting as a pressing member maintains the adjusted angle by being compressed to press the second slide substrate 25 and spring fixing plate 55.

In the position adjustment mechanism 1, the spring fixing plate 55 in which the first screw member 72 is fixed corresponds to a first member. Also, the second slide substrate 25 through which the first screw member 72 passes corresponds to a second member.

In FIG. 7, the position of the fixing substrate main body 651 of the projector fixing substrate 65 in the condition in which the first dial 71 is rotated in the clockwise direction is indicated by E. The position of the fixing substrate main body 651 in a horizontal condition is indicated by the two-dot chain line of D.

On the contrary, by rotating the first dial 71 in the counterclockwise direction, the threaded engagement thereof with the first screw member 72 regresses, and the first dial 71 and the head 72a of the first screw member 72 are distanced from one another. In accordance with this, the spring fixing plate 55 rotates in a direction away from the second slide substrate 25 with the first turning pivot member 74, which is guided by the first holding plate 30 and pivotal support plate 35, as the central axis. At this time, the first spring member 73 maintains the adjusted angle by the compression being released to press the second slide substrate 25 and spring fixing plate 55.

In FIG. 7, the position of the fixing substrate main body 651 of the projector fixing substrate 65 in the condition in which the first dial 71 is rotated in the counterclockwise direction is indicated by the two-dot chain line of F.

As heretofore described, by rotating the first dial 71, it is possible to carryout the horizontal roll adjustment. The adjustment width of the horizontal roll adjustment carried out by using the horizontal roll mechanism section 70 is taken to be, in the embodiment, about ±8°. However, not being limited to this adjustment angle, it is possible to set any adjustment angle as appropriate.

By rotating the first dial 71, the pivot support plate 35 to the projector fixing substrate 65 rotate with the first turning pivot member 74 as the central axis. In this case, the first screw member 72 and second screw member 82 move inside the first screw member relief hole 254 and second screw member relief hole 255 of the second slide substrate 25 which they pass through, respectively.

Next, a description will be given of the up-down tilt adjustment of the position adjustment mechanism 1.

Figure 8:
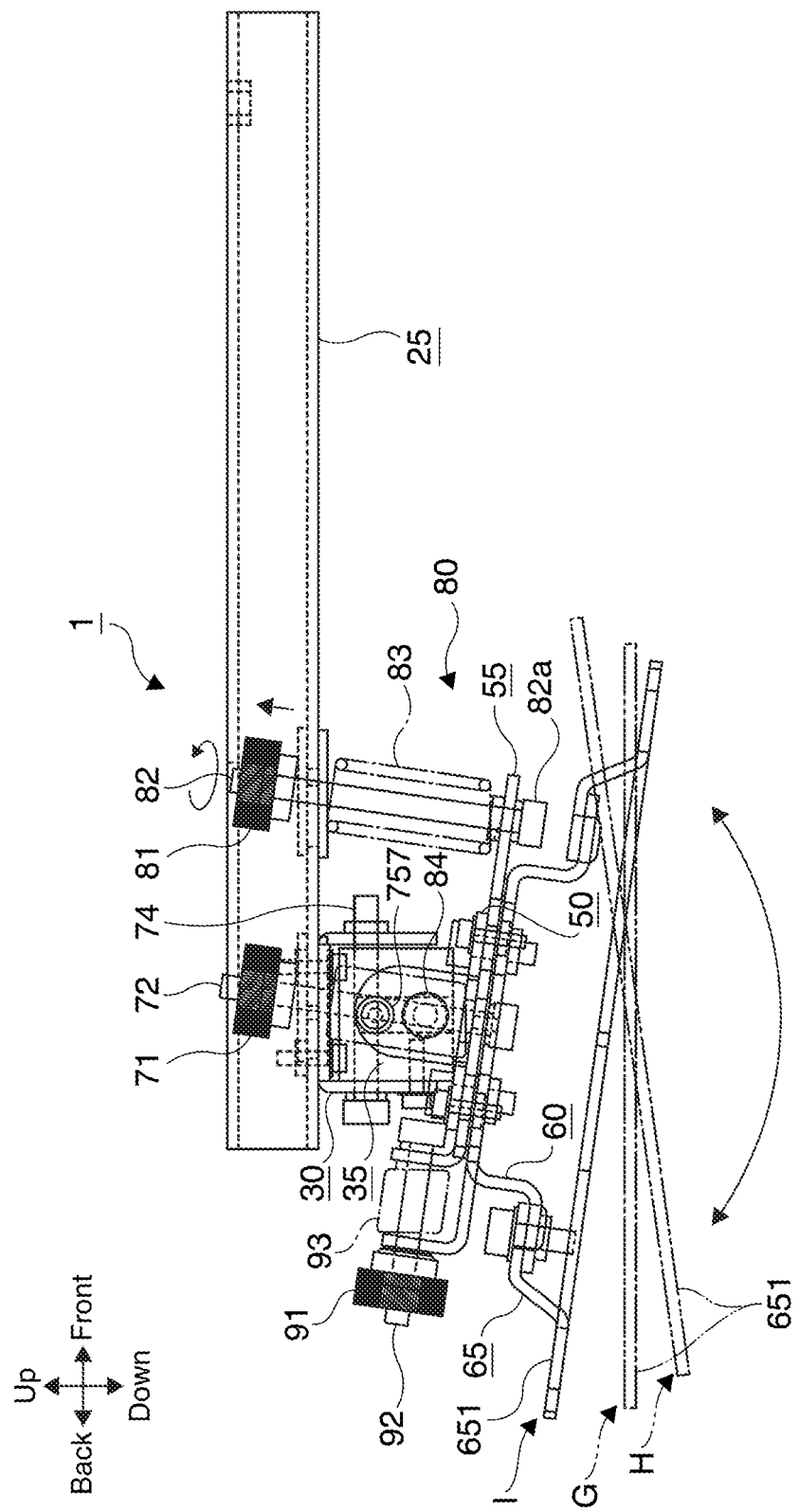
FIG. 8 is a drawing of a condition in which an up-down tilt adjustment is carried out, seen from a right direction.

FIG. 8 is a drawing of a condition in which the up-down tilt adjustment is carried out, seen from the right direction. FIG. 8 shows the second slide substrate 25 to the projector fixing substrate 65 and, for convenience of description, others are omitted.

The up-down tilt adjustment is carried out using the up-down tilt mechanism section 80. Specifically, the angle formed by the spring fixing plate 55 with respect to the second slide substrate 25 is adjusted by turning the second dial 81 shown in FIG. 8.

As shown in FIG. 8, by rotating the second dial 81 acting as a turning member in the counterclockwise direction, the threaded engagement thereof with the second screw member 82 acting as a screw member regresses, and the second dial 81 and the head 82a of the second screw member 82 are distanced from one another. In accordance with this, the spring fixing plate 55 rotates in a direction away from the second slide substrate 25 with the second turning pivot member 84, which is disposed perpendicular to the axial direction of the second screw member 82 and guided by the second holding plate 50 and pivotal support plate 35, as the central axis. Because of this, it is possible to adjust the angle formed by the second slide substrate 25 and spring fixing plate 55. At this time, the second spring member 83 acting as a pressing member maintains the adjusted angle by the compression being released to press the second slide substrate 25 and spring fixing plate 55.

In the position adjustment mechanism 1, the spring fixing plate 55 in which the second screw member 82 is fixed corresponds to the first member. Also, the second slide substrate 25 through which the second screw member 82 passes corresponds to the second member.

In FIG. 8, the position of the fixing substrate main body 651 of the projector fixing substrate 65 in the condition in which the second dial 81 is rotated in the counterclockwise direction is indicated by I. The position of the fixing substrate main body 651 in a horizontal condition is indicated by the two-dot chain line of G.

On the contrary, by rotating the second dial 81 in the clockwise direction, the threaded engagement thereof with the second screw member 82 progresses, and the second dial 81 and the head 82a of the second screw member 82 come closer. In accordance with this, the spring fixing plate 55 rotates in the direction of the second slide substrate 25 with the second turning pivot member 84 guided by the second holding plate 50 and pivotal support plate 35 as the central axis. At this time, the second spring member 83 maintains the adjusted angle by being compressed to press the second slide substrate 25 and spring fixing plate 55.

In FIG. 8, the position of the fixing substrate main body 651 of the projector fixing substrate 65 in the condition in which the second dial 81 is rotated in the clockwise direction is indicated by the two-dot chain line of H.

As heretofore described, by rotating the second dial 81, it is possible to carry out the up-down tilt adjustment. The adjustment width of the up-down tilt adjustment carried out by using the up-down tilt mechanism section 80 is taken to be, in the embodiment, about ±8°. However, not being limited to this adjustment angle, it is possible to set any adjustment angle as appropriate.

By rotating the second dial 81, the pivotal support plate 35 to the projector fixing substrate 65 rotate with the second turning pivot member 84 as the central axis. In this case, the second screw member 82 and first screw member 72 move inside the second screw member relief hole 255 and first screw member relief hole 254 of the second slide substrate 25 which they pass through, respectively.

A rattling occurring due to space between component members is suppressed by the pressing forces of the first spring member 73 and second spring member 83 which press the second slide substrate 25 and spring fixing plate 55. Because of this, a position gap between component members after carrying out the horizontal roll adjustment and up-down tilt adjustment is prevented, and the adjusted angle is reliably maintained. Also, by tightening the temporarily fixed fixing screws 754 and 757 after carrying out the horizontal roll adjustment and up-down tilt adjustment, the position gap after the position adjustment is further prevented, and the adjusted angle is more reliably maintained.

Next, a description will be given of the horizontal rotation adjustment of the position adjustment mechanism 1.

Figure 9:
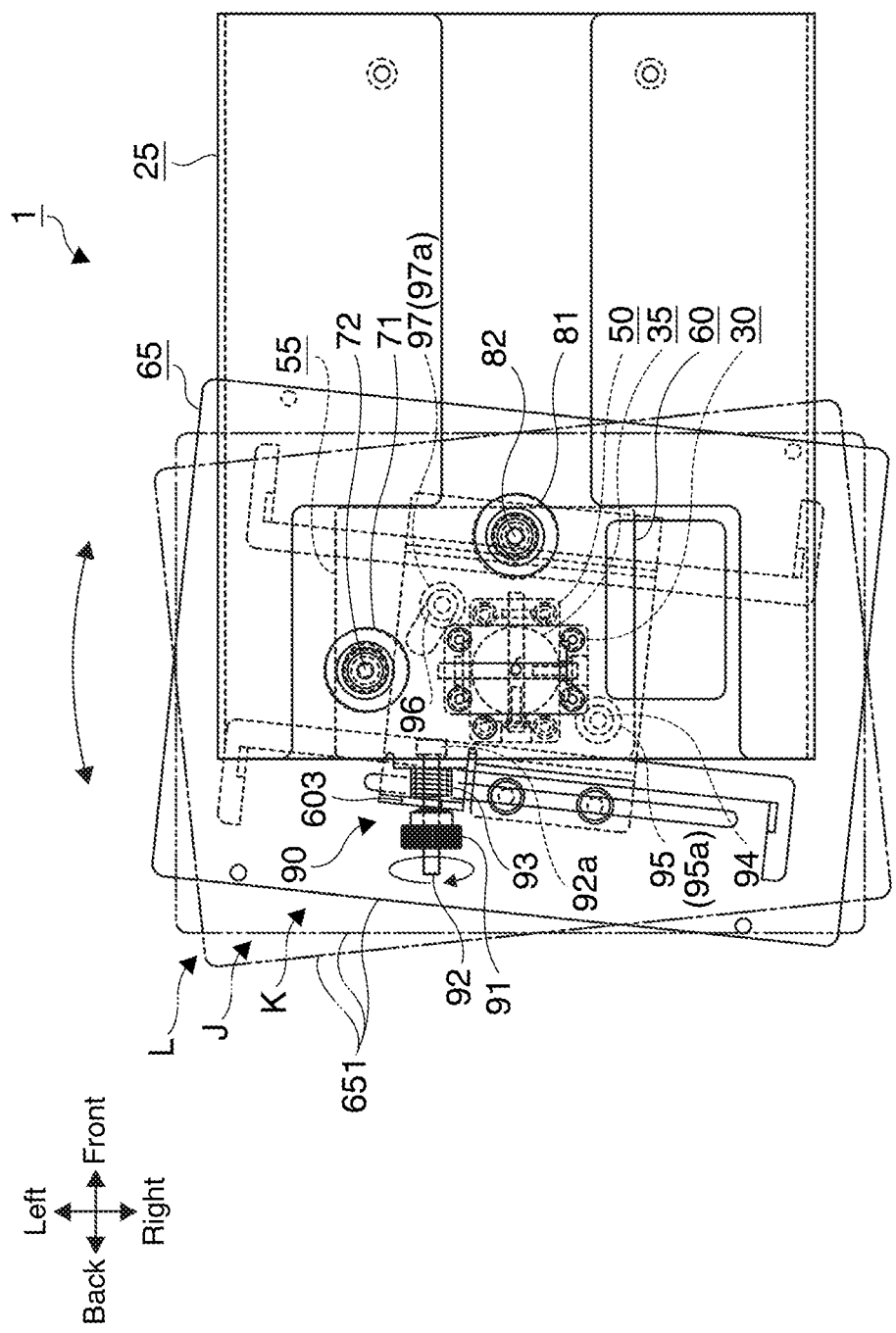
FIG. 9 is a drawing of a condition in which a horizontal rotation adjustment is carried out, seen from above.
Figure 10B:
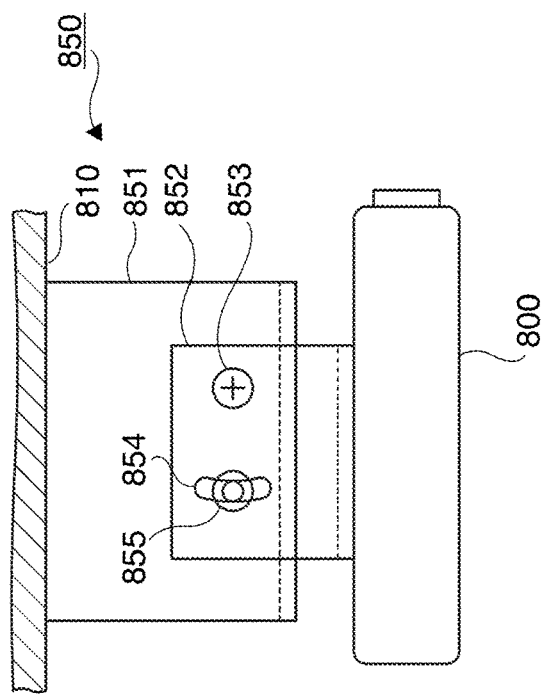
FIGS. 10A and 10B are schematic configuration diagrams of a heretofore known projector suspension device, where
Figure 10A:
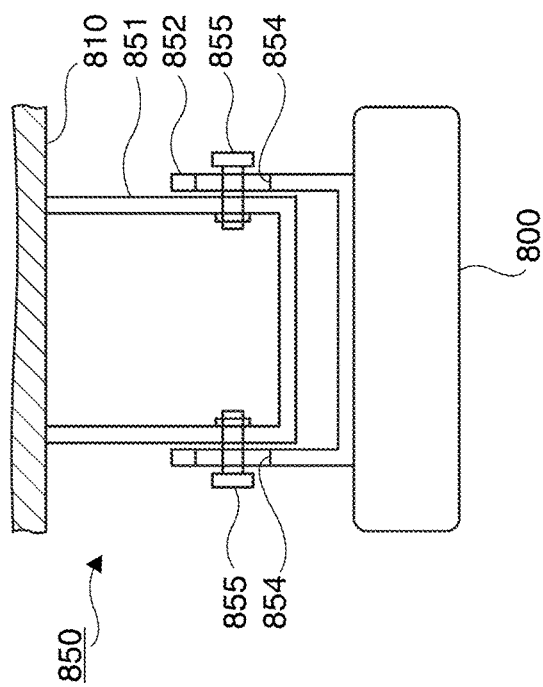

FIG. 9 is a drawing of a condition in which the horizontal rotation adjustment is carried out, seen from the up direction. FIG. 9 shows the second slide substrate 25 to the projector fixing substrate 65 and, for convenience of description, others are omitted.

The horizontal rotation adjustment is carried out using the horizontal rotation mechanism section 90. Specifically, the angle formed when the third slide substrate 60 pivots parallel to the spring fixing plate 55 is adjusted by turning the third dial 91 shown in FIGS. 3 and 9.

As shown in FIG. 9, by rotating the third dial 91 acting as a turning member in the clockwise direction, the threaded engagement thereof with the third screw member 92 acting as a screw member progresses, and the third dial 91 and the head 92a of the third screw member 92 come closer. In accordance with this, the third slide substrate 60 rotates in the direction of the spring fixing plate 55 with the third turning pivot member 94, which is disposed perpendicular to the axial direction of the third screw member 92 and guided by the spring fixing plate 55 and third slide substrate 60, as the central axis. Because of this, it is possible to adjust the angle formed by the spring fixing plate 55 and third slide substrate 60. At this time, the third spring member 93 acting as a pressing member maintains the adjusted angle by being compressed to press the third slide substrate 60 and spring fixing plate 55.

When the third slide substrate 60 rotates, the displacement of the central axis is prevented by the sliding portion 95a of the third pivot guide member 95, through which the third turning pivot member 94 is inserted, sliding inside the third pivot guide member hole 554 of the spring fixing plate 55. Also, the rotation is stabilized by the sliding portion 97a of the pivoting limit guide member 97, through which the pivoting limit member 96 is inserted, sliding along the limit slot 555 of the spring fixing plate 55. Also, the thickness in the up-down direction of the horizontal rotation mechanism section 90 is made as thin as possible by using this kind of horizontal rotation mechanism section 90.

In the position adjustment mechanism 1, the spring fixing plate 55 in which the third screw member 92 is fixed corresponds to the first member. Also, the third slide substrate 60 through which the third screw member 92 passes corresponds to the second member.

In FIG. 9, the position of the fixing substrate main body 651 of the projector fixing substrate 65 in the condition in which the third dial 91 is rotated in the clockwise direction is indicated by K. The position of the fixing substrate main body 651 in a condition in which it is parallel to the wall surface 900 is indicated by the two-dot chain line of J.

On the contrary, by rotating the third dial 91 in the counterclockwise direction, the threaded engagement thereof with the third screw member 92 regresses, and the third dial 91 and the head 92a of the third screw member 92 are distanced from one another. In accordance with this, the third slide substrate 60 rotates in a direction away from the spring fixing plate 55 with the third turning pivot member 94 guided by the spring fixing plate 55 and third slide substrate 60 as the central axis. At this time, the third spring member 93 maintains the adjusted angle by the compression being released to press the third slide substrate 60 and spring fixing plate 55.

In FIG. 9, the position of the fixing substrate main body 651 of the projector fixing substrate 65 in the condition in which the third dial 91 is rotated in the counterclockwise direction is indicated by the two-dot chain line of L.

As heretofore described, by rotating the third dial 91, it is possible to carry out the horizontal rotation adjustment. The adjustment width of the horizontal rotation adjustment carried out by using the horizontal rotation mechanism section 90 is taken to be, in the embodiment, about ±6°. However, not being limited to this adjustment angle, it is possible to set any adjustment angle as appropriate.

By rotating the third dial 91, the third slide substrate 60 and projector fixing substrate 65 rotate with the third turning pivot member 94 as the central axis. In this case, the third screw member 92 moves inside the third screw member relief hole 603 of the third slide substrate 60 through which the third screw member 92 passes.

As heretofore described, by carrying out fine adjustments such as the horizontal roll adjustment, up-down tilt adjustment, and horizontal rotation adjustment, it is possible to accurately align the projection position C with the projection region B.

According to the heretofore described embodiment, it is possible to obtain the following advantages.

According to the projector suspension device 2 of the embodiment, by using the position adjustment mechanism 1 included in the projector suspension device 2, for example, in the case of the horizontal roll mechanism section 70, the first spring member 73, being disposed between the spring fixing plate 55 and second slide substrate 25, presses both members 55 and 25. Also, the first screw member 72, being fixed in the spring fixing plate 55, passes through the second slide substrate 25. Then, by the first dial 71 turning in threaded engagement with the first screw member 72 passing through the second slide substrate 25, the angle formed by the spring fixing plate 55 and second slide substrate 25 is adjusted, against the pressing force of the first spring member 73, with the first turning pivot member 74 acting as a pivot, which is set perpendicular to the axial direction of the first screw member 72, as the center. In this way, it is possible to configure the horizontal roll mechanism section 70 (position adjustment mechanism 1) with a simple configuration including the first spring member 73, first screw member 72, and first dial 71. Also, by the pressing force of the first spring member 73, it is possible to prevent a rattling due to space between component members of the horizontal roll mechanism section 70, and reliably maintain the adjusted angle. Then, by a simple operation of turning the first dial 71, it is possible to carry out a fine adjustment of the angle formed by the spring fixing plate 55 and second slide substrate 25. Because of this, it is possible to carry out a high precision position adjustment (a fine adjustment) with respect to the angle. Consequently, it is possible to carry out a fine adjustment of the projection position C of the projector 5 with a high precision by the reliable maintaining of the adjusted angle and the simple operation. The adjustments in the up-down tilt mechanism section 80 and horizontal rotation mechanism section 90 can also produce the same kinds of advantage as heretofore described.

In particular, when the projector 5 is the short focus projector which, including the projection optical device 47 having the reflecting mirror 472, which causes an image magnification projection onto the screen S at a short distance, as in the embodiment, normally, a very small angle tilt of the projector 5 leads to a large tilt of the projection position C. However, as opposed to this, it is highly advantageous that a high precision position adjustment (a fine adjustment) which adjusts the very small tilt can be reliably carried out using the suspension position adjustment mechanism 1 of the embodiment. Moreover, it is enormously advantageous that, in addition to the front-back adjustment, left-right adjustment, and up-down adjustment, high precision three-direction position adjustments (fine adjustments), the horizontal roll adjustment, up-down tilt adjustment, and horizontal rotation adjustment, can be reliably carried out by the suspension position adjustment mechanism 1.

According to the position adjustment mechanism 1 included in the projector suspension device 2 of the embodiment, there being no need for an adjustor (a user or the like) to make an adjustment while holding the projector, as heretofore known, it is possible to improve an adjustment operability, and it is possible to reduce a burden of the position adjustment on the adjustor. Also, in addition, with respect to time needed for the position adjustment too, it being possible to carry out the position adjustment in a shorter time than heretofore known, it is possible to improve the efficiency of a position adjustment operation.

According to the position adjustment mechanism 1 included in the projector suspension device 2 of the embodiment, for example, in the case of the horizontal roll mechanism section 70, as it is configured so that the first screw member 72 is disposed inserted through the first spring member 73, the miniaturization of the horizontal roll mechanism section 70 is possible in comparison with a configuration wherein the first screw member 72 and first spring member 73 are disposed separately. The same applying to the cases of the up-down tilt mechanism section 80 and horizontal rotation mechanism section 90 too, the miniaturization thereof is possible. Because of this, with the position adjustment mechanism 1 of the embodiment, as well as it being possible to carry out the three-direction fine adjustments, a further miniaturization thereof is possible. This also enables the miniaturization of the projector suspension device 2.

According to the position adjustment mechanism 1 included in the projector suspension device 2 of the embodiment, for example, in the case of the horizontal roll mechanism section 70, as the first spring member 73 is formed of a coil spring, it is possible to achieve a further miniaturization of the horizontal roll mechanism section 70, and it becomes easier to design and process the first spring member 73. The same applying to the cases of the up-down tilt mechanism section 80 and horizontal rotation mechanism section 90 too, a further miniaturization of the position adjustment mechanism 1 of the embodiment is possible, and it becomes easier to design and process the first spring member 73, second spring member 83, and third spring member 93.

According to the position adjustment mechanism 1 included in the projector suspension device 2 of the embodiment, by carrying out the horizontal roll adjustment, up-down tilt adjustment, and horizontal rotation adjustment with respect to the mounting of the projector 5 to fine adjust the angle, it is possible to align the projection position C of the projection image, with a high precision, with respect to the projection region B of the screen S. In particular, in the case of causing an image magnification projection onto the screen S at a short distance, as in the embodiment, as a very small tilt of the projector 5 leads to a large tilt of the projection position C, it is highly advantageous that the very small tilt can be adjusted. Also, the adjustor can easily adjust the angle by operating the position adjustment mechanism 1, and a burden of the position adjustment on the user can be reduced, thereby enabling an improvement in user-friendliness of the position adjustment mechanism 1 (projector suspension device 2).

According to the position adjustment mechanism 1 included in the projector suspension device 2 of the embodiment, it is possible to achieve the miniaturization of the position adjustment mechanism 1 and, in particular, it is possible to reduce the thickness (in the up-down direction). Because of this, as the position adjustment mechanism 1 can be made difficult to see by the user when the projector 5 is mounted on the position adjustment mechanism 1, it is possible to suppress an uncomfortable feeling toward the position adjustment mechanism 1 (projector suspension device 2).

The invention not being limited to the heretofore described embodiment, it is possible to implement the invention by making various modifications or improvements without departing from the scope thereof.

With the position adjustment mechanism 1 of the heretofore described embodiment, for example, in the case of the horizontal roll mechanism section 70, the first spring member 73, being disposed between the spring fixing plate 55 and second slide substrate 25, presses both members 55 and 25. However, a pressing structure not being limited to this, a configuration is also acceptable wherein the spring fixing plate 55 and second slide substrate 25 are each pressed from outside (the spring fixing plate 55 is pressed from the down direction, and the second slide substrate 25 from the up direction). The same applies to the structures of the up-down tilt mechanism section 80 and horizontal rotation mechanism section 90 too.

With the position adjustment mechanism 1 of the heretofore described embodiment, for example, in the case of the horizontal roll mechanism section 70, the first screw member 72 is disposed passing through the first spring member 73. However, the invention not being limited to this, the first screw member 72 may also be disposed without passing through the first spring member 73. The same applies to the structures of the up-down tilt mechanism section 80 and horizontal rotation mechanism section 90 too.

With the position adjustment mechanism 1 of the heretofore described embodiment, for example, in the case of the horizontal roll mechanism section 70, the first spring member 73 is formed of a coil spring. However, the invention not being limited to this, it may also be formed of a leaf spring, or the like. The same applies to the structures of the up-down tilt mechanism section 80 and horizontal rotation mechanism section 90 too.

The position adjustment mechanism 1 of the heretofore described embodiment is fixed to (installed on) the wall surface 900. However, the invention not being limited to this, the position adjustment mechanism 1 can also be fixed to (installed on) a ceiling by changing the shape of the base substrate 10, or the like, of the position adjustment mechanism 1.

With the position adjustment mechanism 1 of the heretofore described embodiment, the mounting position (angle) of the projector 5 is fine adjusted using the projector 5. However, the invention not being limited to this, it is possible to apply the position adjustment mechanism 1 of the embodiment to various kinds of apparatus whose installation position need be fine adjusted.

The projector 5 installed on the position adjustment mechanism 1 of the heretofore described embodiment uses a lens integrator optical system configured of the lens arrays 421 and 422 as the optical system (illumination optical device 42) which equalizes the illuminance of an emitted luminous flux but, the invention not being limited to this, it is also possible to use a rod integrator optical system configured of a light guide rod.

In the optical system of the projector 5 installed on the position adjustment mechanism 1 of the heretofore described embodiment, the liquid crystal panels 451R, 451G, and 451B acting as the light modulation elements employ transmissive liquid crystal panels, but it is also possible to use reflective light modulation elements such as reflective liquid crystal panels.

The projector 5 installed on the position adjustment mechanism 1 of the heretofore described embodiment employs in the optical system the liquid crystal panels 451R, 451G, and 451B acting as the light modulation elements. However, the invention not being limited to this, any light modulation elements are sufficient, provided that they modulate an incident luminous flux based on an image signal, and micromirror type light modulation elements may also be employed. As micromirror type light modulation elements, it is possible to use, for example, digital micromirror devices (DMD's).

In the optical system of the projector 5 installed on the position adjustment mechanism 1 of the heretofore described embodiment, the light modulation elements employ a so-called three panel system of a configuration wherein the three liquid crystal panels 451R, 451G, and 451B are used corresponding to the red color light, green color light, and blue color light. However, the invention not being limited to this, a single panel system may also be employed. Also, a liquid crystal panel for improving contrast may be added and employed.

In the optical system of the projector 5 installed on the position adjustment mechanism 1 of the heretofore described embodiment, the light source lamp 41, not being limited to the configuration described in the heretofore described embodiment, may also be configured of any kind of solid light emitting element, such as a laser diode, a light emitting diode (LED), an organic electro luminescence (EL) element, a silicon light emitting element, or the like.

What is claimed is:

1. A projector suspension device for a projector comprising:
   a base configured to be fixed to a wall surface;
   a support member extending from the base, the support member configured to support the projector; and
   an adjustment mechanism configured to adjust a rotation of the projector and a position of the projector, the adjustment mechanism including
      a first slide substrate configured to slide with respect to the support member in a first direction perpendicular to the wall surface and adjust the position of the projector in the first direction, the first slide substrate configured to be fixed to the support member,
      a substrate configured to be fixed to the first slide substrate,
      a first rotating substrate connected to the substrate, the first rotating substrate configured to rotate with respect to the substrate,
      a second rotating substrate connected to the first rotating substrate, the second rotating substrate configured to rotate with respect to the first rotating substrate about an axis that is parallel to the wall surface and perpendicular to a plane surface of the substrate, and a turning member configured to adjust a rotation of the second rotating substrate, the turning member having a rotating pivot which is perpendicular to the base, wherein the second rotating substrate is configured to rotate about the axis by rotation of the turning member, and the rotating pivot of the turning member is parallel to the first direction.

2. The projector suspension device according to claim 1, the adjustment mechanism further including a stopper connected to the turning member, the stopper configured to contact with the second rotating substrate in a side of the stopper, the side being a side that the stopper is connected to the turning member, wherein the second rotating substrate is configured to rotate about the axis by change of a position of the stopper with respect to the first rotating substrate.

3. The projector suspension device according to claim 1, wherein:

the adjustment mechanism further includes a projector fixing substrate connected to the second rotating substrate, the projector fixing substrate configured to fix the projector, the projector fixing substrate is configured to slide with respect to the second rotating substrate in a second direction and adjust the position of the projector, and the second direction is perpendicular to both the first direction and the axis of the second rotating substrate.

4. A projector suspension device for a projector comprising:

a base configured to be fixed to a wall surface;

a support member extending from the base, the support member configured to support the projector; and an adjustment mechanism configured to adjust a rotation of the projector and a position of the projector, the adjustment mechanism including a first slide substrate configured to slide with respect to the support member in a first direction perpendicular to the wall surface and adjust the position of the projector in the first direction, the first slide substrate configured to be fixed to the support member, a substrate configured to be fixed to the first slide substrate, a first rotating substrate connected to the substrate, the first rotating substrate configured to rotate with respect to the substrate, a second rotating substrate connected to the first rotating substrate, the second rotating substrate configured to rotate with respect to the first rotating substrate about an axis that is parallel to the wall surface and perpendicular to a plane surface of the substrate, a turning member configured to adjust a rotation of the second rotating substrate, the turning member having a rotating pivot which is perpendicular to the base, and a turning pivot member having a turning pivot that extends along the axis parallel to the wall surface and perpendicular to the plane surface of the substrate, the turning pivot member passing through the first rotating substrate and the second rotating substrate, wherein the second rotating substrate is configured to rotate about the axis by rotation of the turning member.

5. The projector suspension device according to claim 4, wherein:

the adjustment mechanism further includes a projector fixing substrate connected to the second rotating substrate, the projector fixing substrate configured to fix the projector, the projector fixing substrate is configured to slide with respect to the second rotating substrate in a second direction and adjust the position of the projector, and the second direction is perpendicular to both the first direction and the axis of the second rotating substrate.

* * * * *